Nov. 21, 1950  W. E. WILSON  2,531,181
AUTOMATIC ARC WELDING APPARATUS
Filed Dec. 2, 1948  8 Sheets-Sheet 1
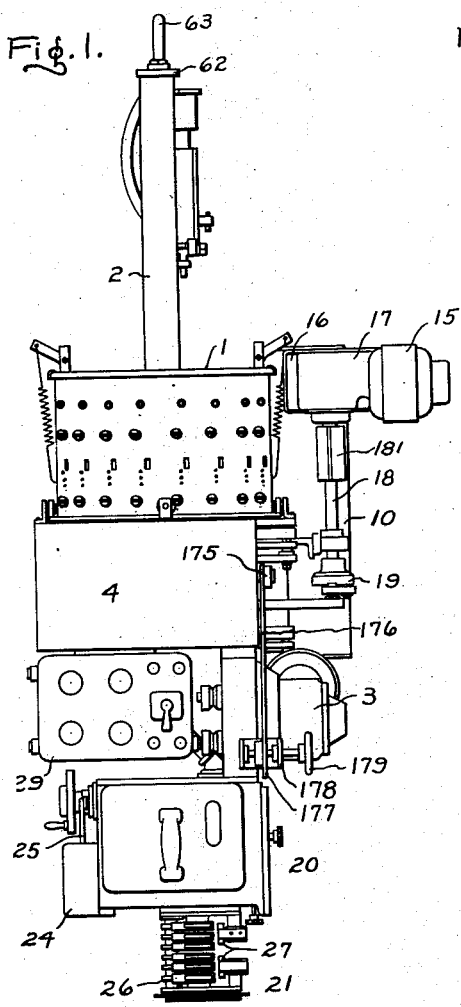
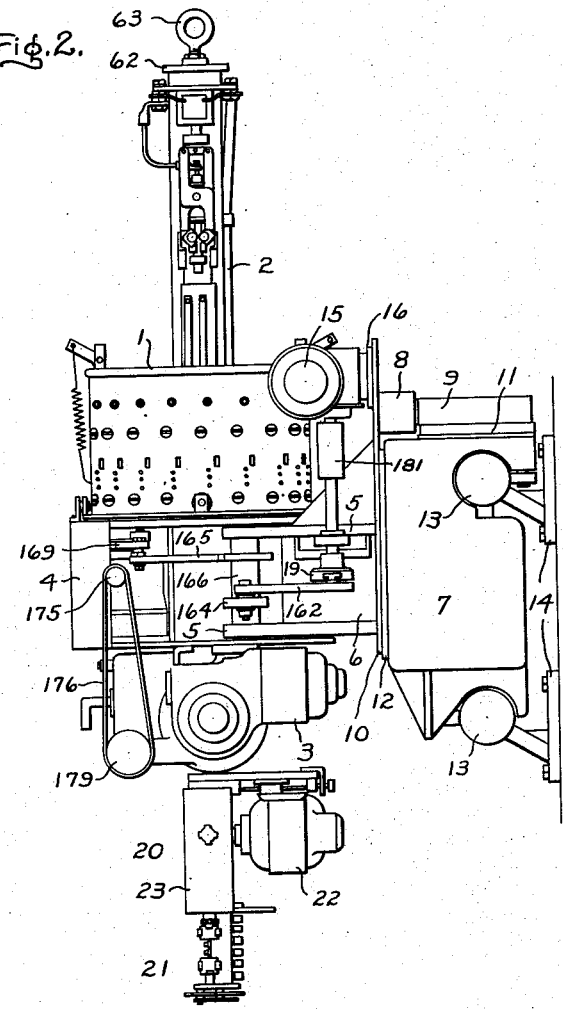
Inventor
Wayne E. Wilson,
by *[signature]*
His Attorney.

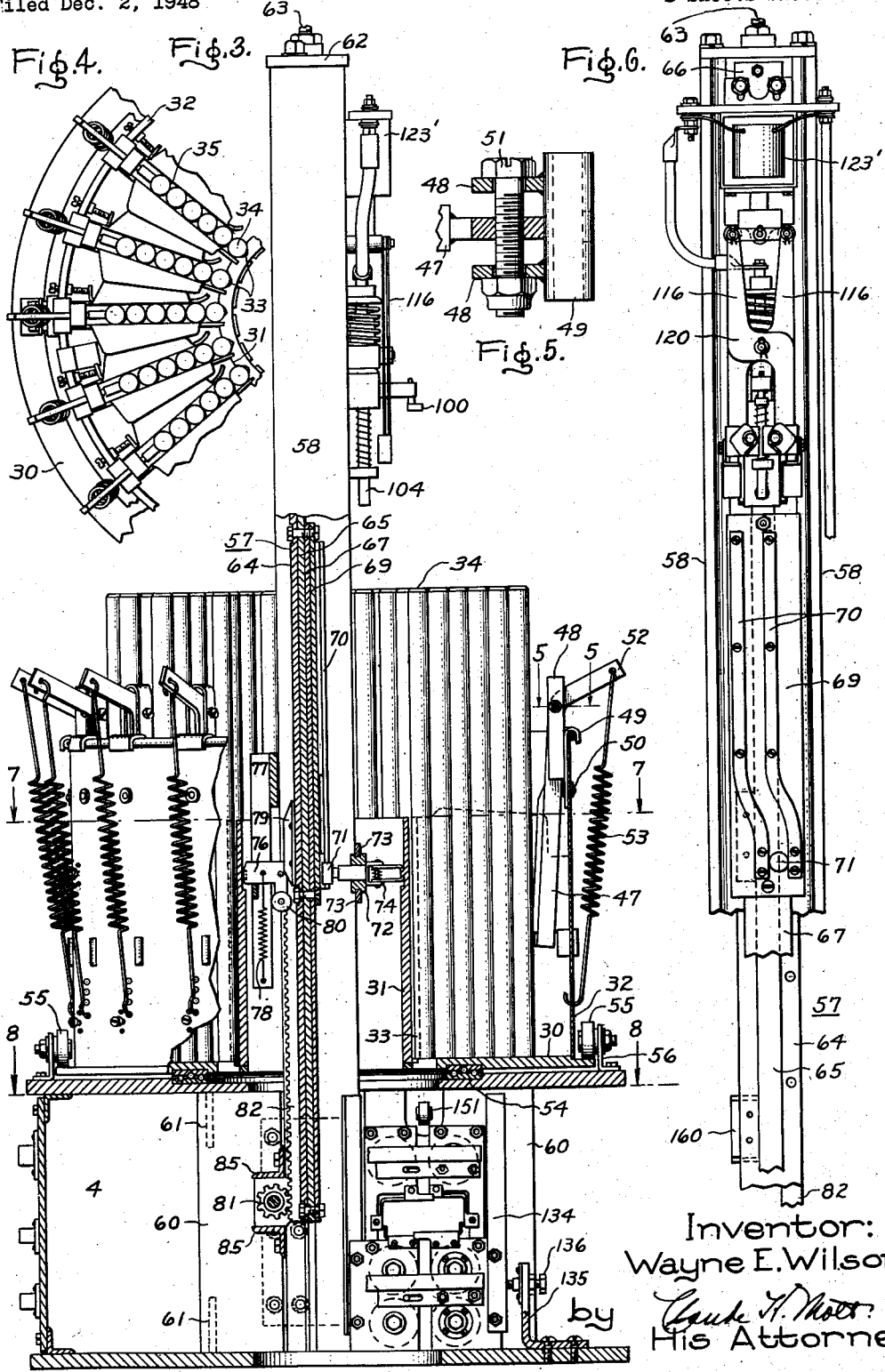

Nov. 21, 1950 W. E. WILSON 2,531,181
AUTOMATIC ARC WELDING APPARATUS
Filed Dec. 2, 1948 8 Sheets-Sheet 3
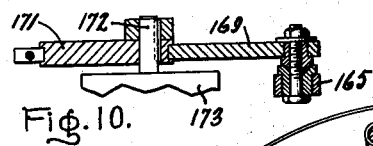
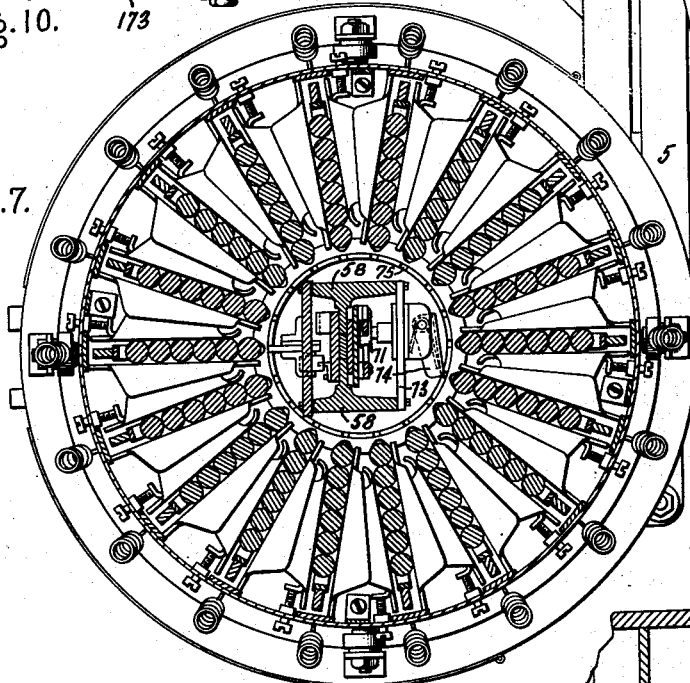
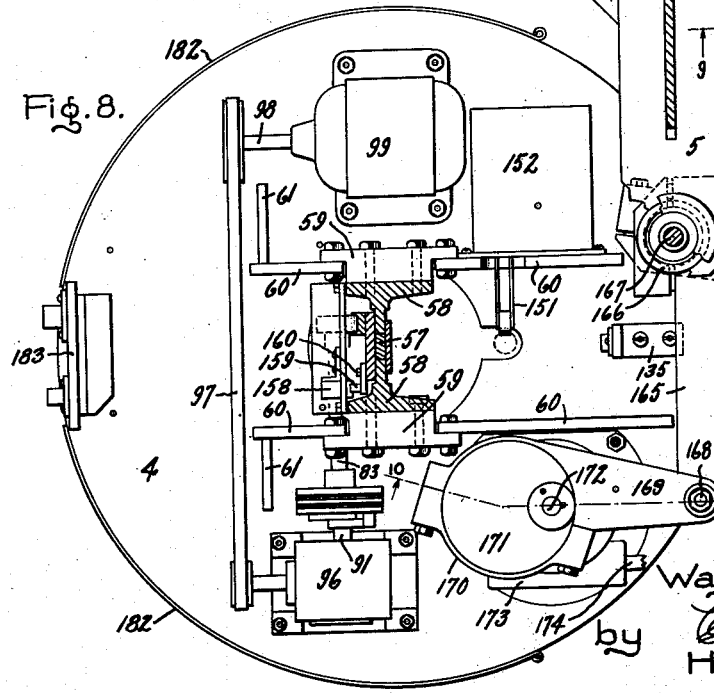
Inventor:
Wayne E. Wilson,
by His Attorney

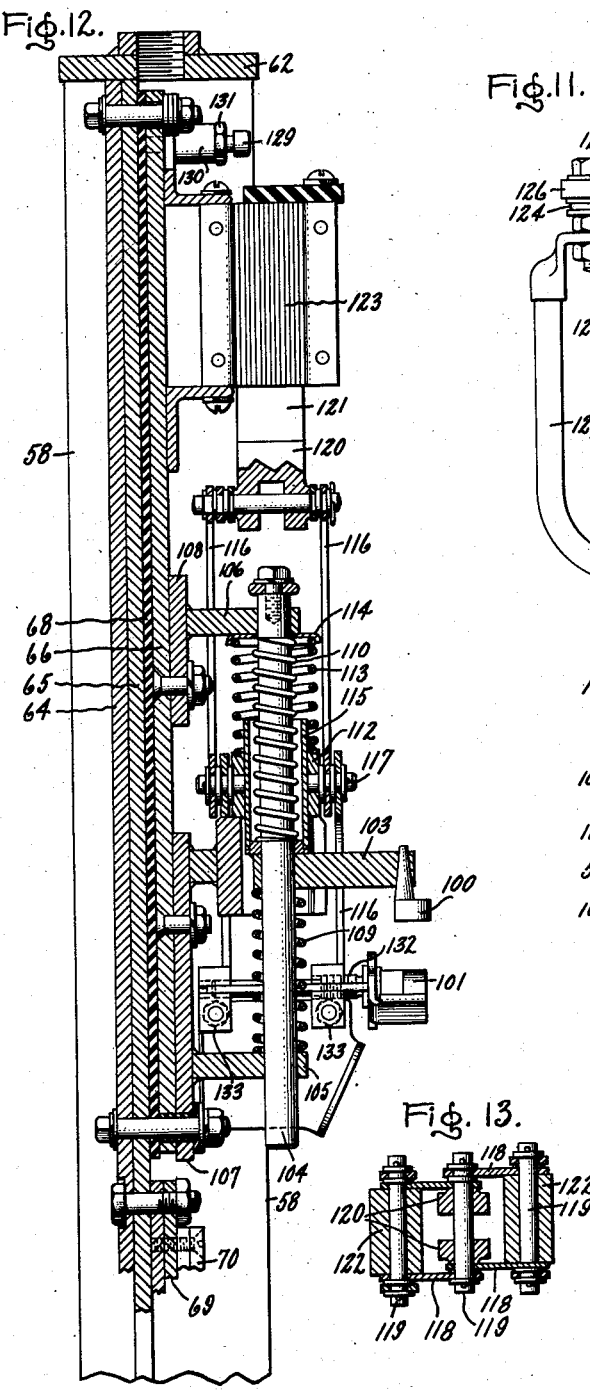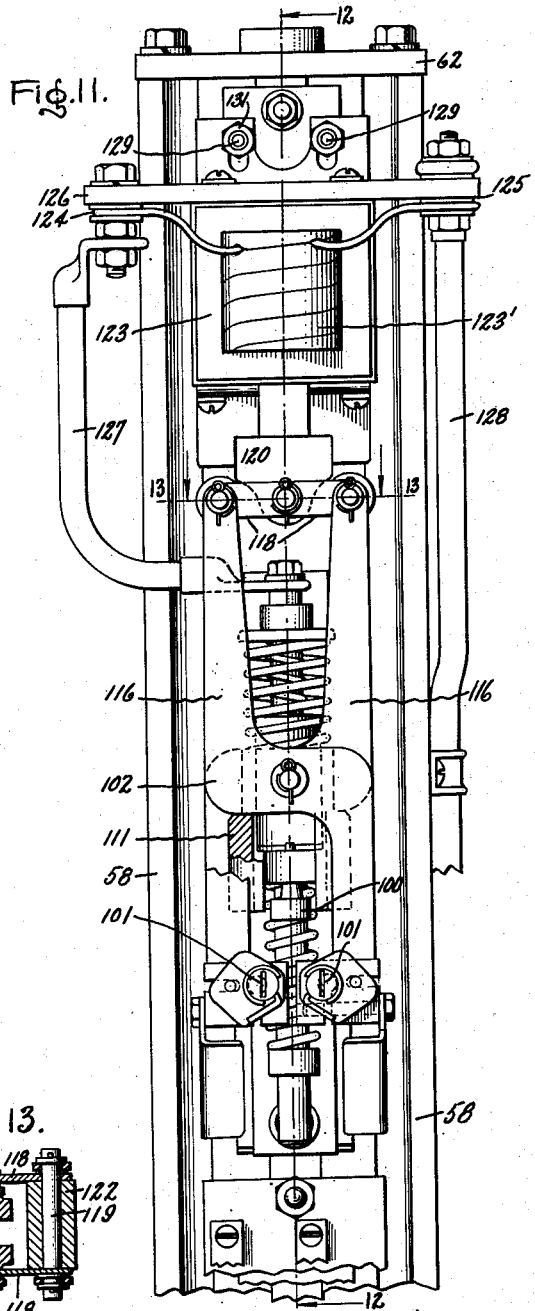

Nov. 21, 1950 — W. E. WILSON — 2,531,181
AUTOMATIC ARC WELDING APPARATUS
Filed Dec. 2, 1948 — 8 Sheets-Sheet 5
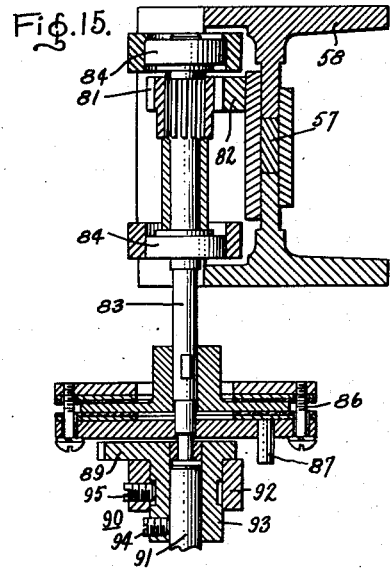
Fig. 15.
Fig. 14.
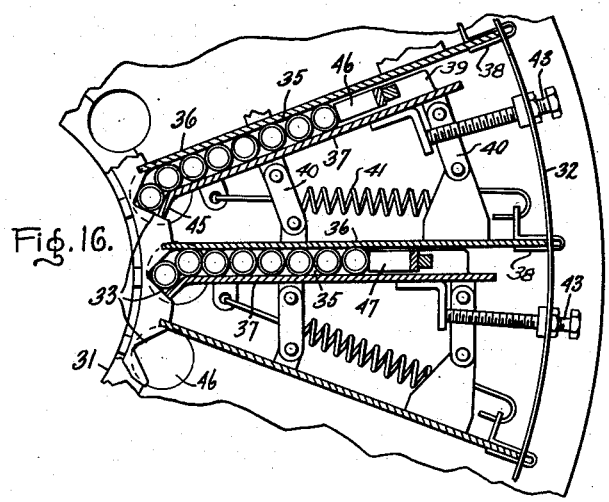
Fig. 16.
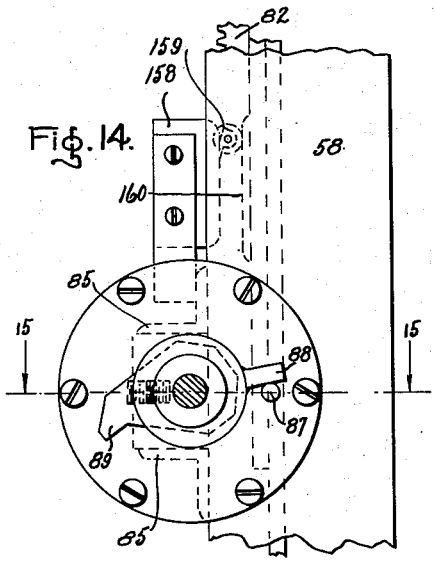
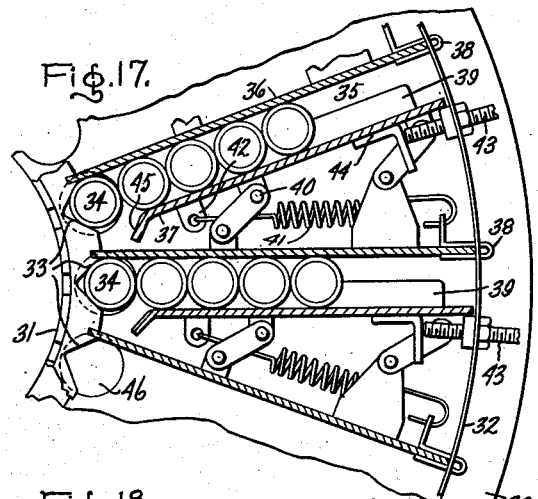
Fig. 17.
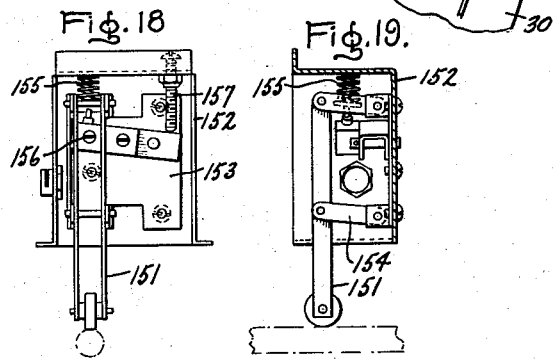
Fig. 18.   Fig. 19.
Inventor:
Wayne E. Wilson,
by Claude A. Mott
His Attorney

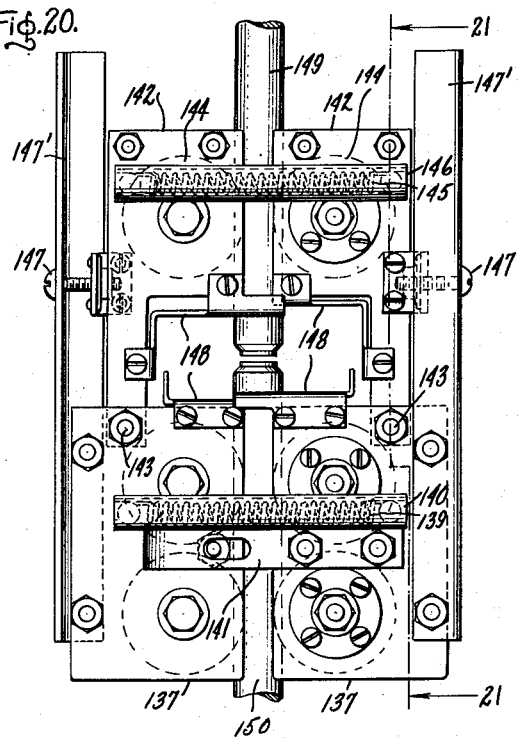
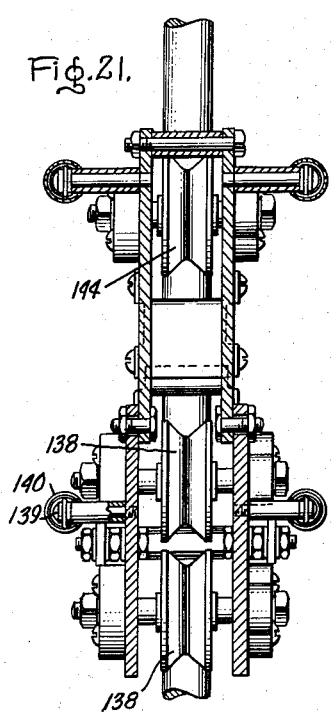
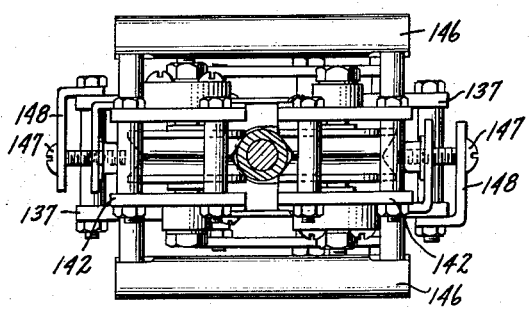

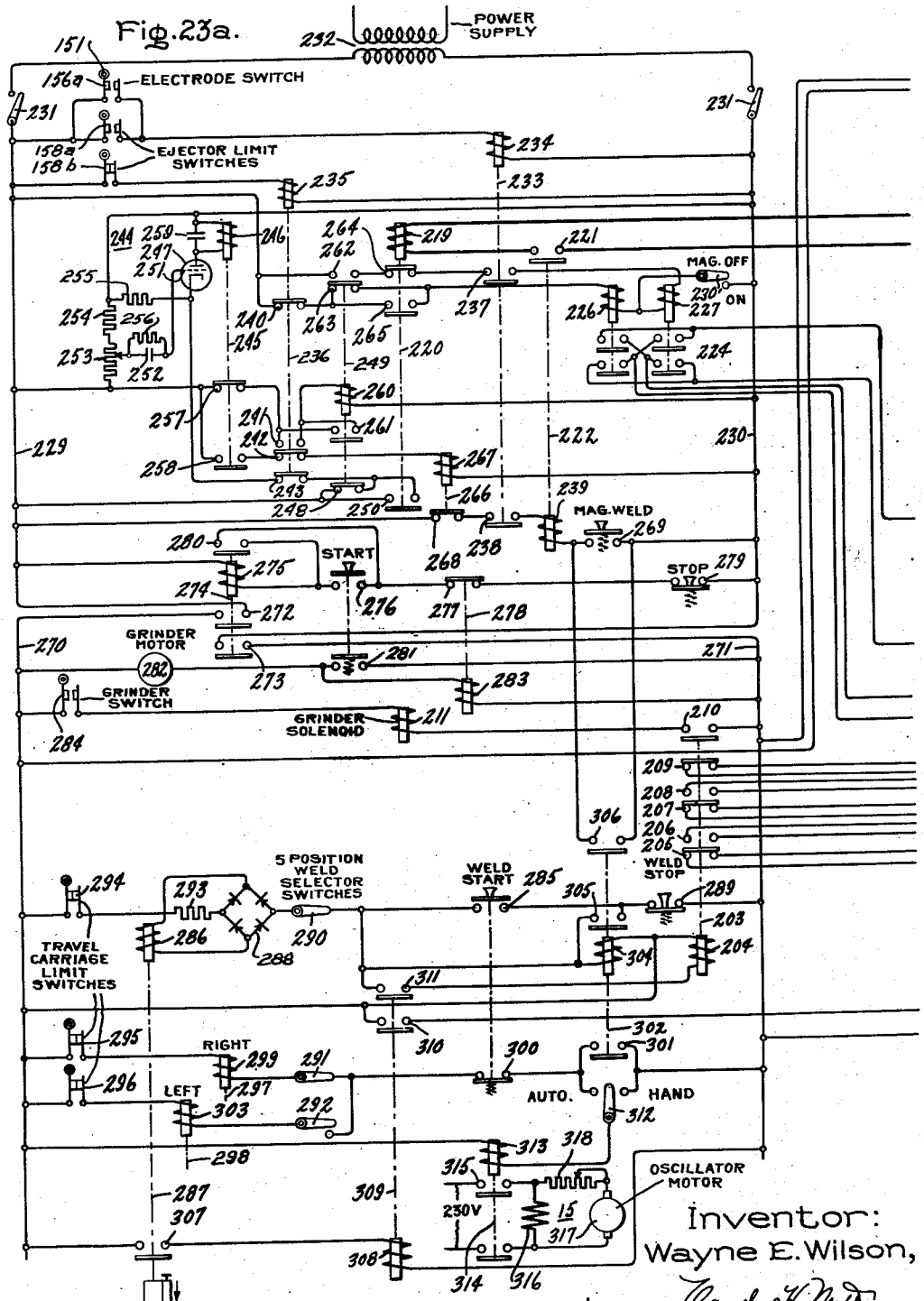

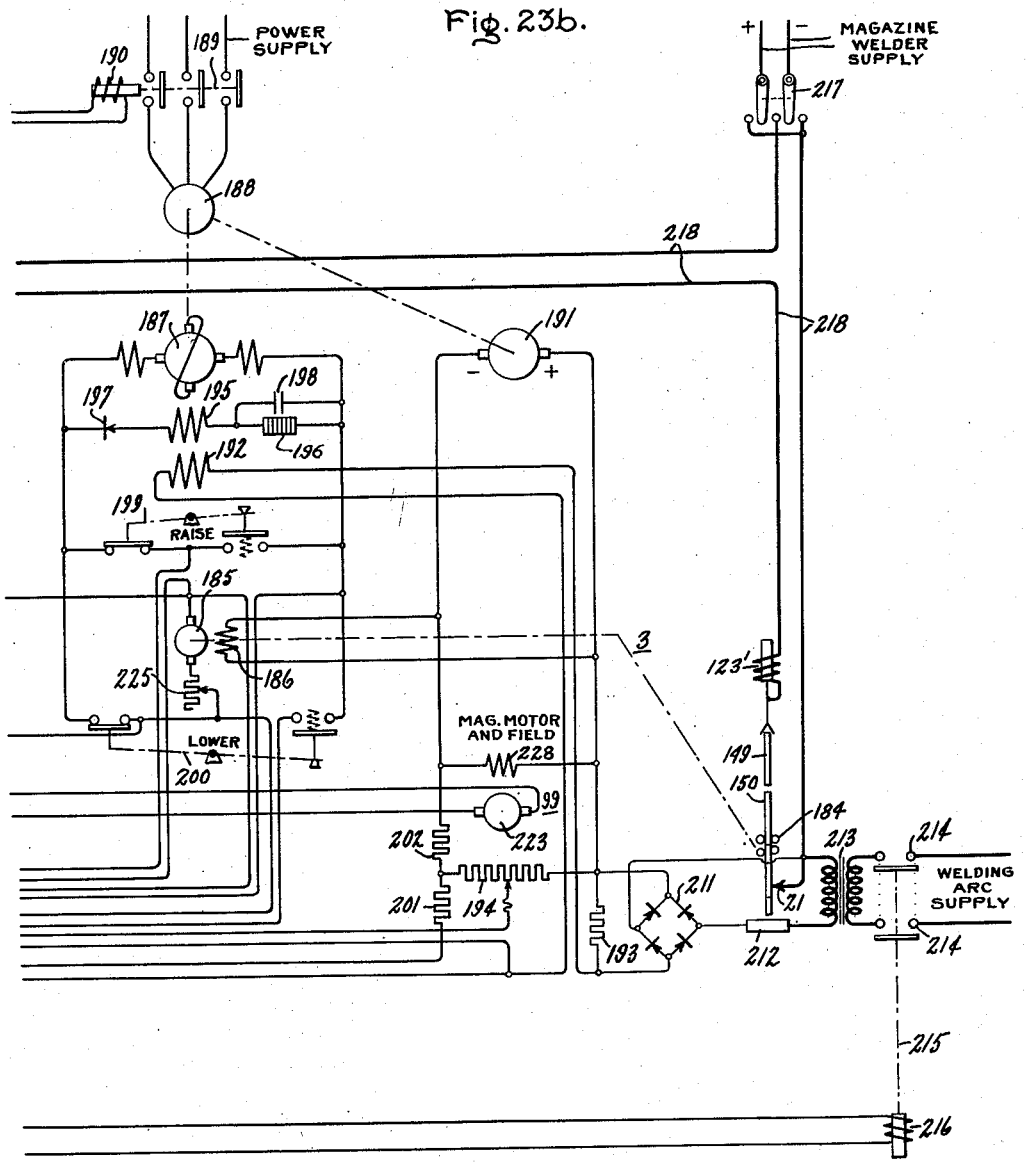

Patented Nov. 21, 1950

2,531,181

UNITED STATES PATENT OFFICE 2,531,181

AUTOMATIC ARC WELDING APPARATUS

Wayne E. Wilson, Fitchburg, Mass., assignor to General Electric Company, a corporation of New York Application December 2, 1948, Serial No. 63,041

19 Claims. (Cl. 314—5)

My invention relates to automatic arc welding apparatus for supplying to the electrode feeding means thereof a succession of unit length electrodes each of which in turn is welded in end to end engagement with the unconsumed residue of unit length electrodes previously supplied to said feeding means and still subject to its feeding action so that a continuous unbroken length of electrode material may be supplied as needed to maintain an uninterrupted welding arc for as long as desired.

Continuous arc welding operations have heretofore been performed by using mechanisms which feed electrode material from a reel containing the necessary supply of the electrode material. Such arrangements, however, have practical limitations determined primarily by the maximum diameter of the electrode material and the type of electrode material employed. Where the electrode material has a diameter greater than one-quarter of an inch, difficulties are encountered in coiling and uncoiling it from its reel. The various types of electrode material are characterized principally by the flux coating employed thereon to facilitate welding and the deposit of weld metal of the desired quality. These coatings of flux are of different kinds and thickness for different types of electrode material and different types of welding. When the coatings of flux do not adhere firmly to the electrode material and when these coatings are of substantial thickness, it becomes difficult to coil and uncoil the electrode material without damaging these flux coatings. This is true even though special arrangements are employed for holding the fluxes on the electrode material. In order to avoid these limitations as to maximum diameter and type of electrode material, it has been proposed to employ mechanisms which feed in succession unit length electrodes which are straight and are joined in end to end engagement to form a continuous electrode column which is supplied by the electrode feeding mechanism to the welding arc in accordance with its consumption therein. These unit length electrodes are usually of the type commonly employed in performing arc welding operations by hand. When flux coated, they may be modified, however, so that the flux coating extends practically to the very ends thereof instead of having one end bared of flux coating for a substantial distance for insertion between the jaws of an electrode holder as when performing hand welding operations. These unit length electrodes may be connected in such mechanism by means of a mechanical joint between their ends but it is preferable to form such joint by welding in order to eliminate high resistance sections in the resulting electrode column which would adversely affect the automatic control used in feeding it.

It is an object of my invention to provide an automatic arc welding apparatus of improved construction for feeding in succession unit length electrodes which are joined in end to end engagement by means of an arc welding operation to form an electrode column which is supplied to the arc by an automatic feeding mechanism forming part of the apparatus.

It is a further object of my invention to provide a magazine in which unit length electrodes are stored and from which they are fed one at a time by an ejector mechanism into end to end engagement with the electrode column in the feeding means.

It is also an object of my invention to provide a cylindrical magazine having radially disposed cells which are adjustable for accommodating electrodes of different sizes.

It is a further object of my invention to provide an ejector mechanism which rotates the magazine to position a different one of its cells in electrode ejecting position and thereafter eject the foremost electrode in said cell in end to end engagement with the trailing end of the electrode column in the feeding means.

It is also an object of my invention to provide means for feeding the ejector from and to a retracted position and for imposing a dwell or rest period in the travel thereof at the time the unit length electrode ejected from the magazine comes into end to end engagement with the electrode column in the feeding means.

It is also an object of my invention to provide on the ejector mechanism means for supplying welding current to the unit length electrode engaged thereby and for withdrawing this electrode from the electrode column which is also supplied with arc welding current in order to strike a welding arc between the leading end of the unit length electrode and the trailing end of the electrode column and thereafter to force these ends into reengagement after the arc welding current has flowed therebetween for a predetermined interval of time in order to form an arc welded union between these ends.

It is also a further object of my invention to provide a frame on which the above referred to co-acting parts are supported in operative relationship to one another and in which means are provided for aligning the contacting ends of the unit length electrode and the electrode column at the time these ends are united by the arc welding operation.

It is also an object of my invention to provide an adjustable oscillator mechanism having a construction and organization of parts which accommodate the structural features of an arc welding head of the above described type.

Further objects of my invention will become apparent from a consideration of the embodiment thereof illustrated in the accompanying drawings.

In these drawings, Figs. 1 and 2 are front and side views of my apparatus. These views have been simplified by omitting certain details of structure which are completely illustrated in other figures of the drawings. Fig. 3 is a view partly in section which illustrates the electrode magazine, the frame on which it is supported, the electrode aligner in this frame, the ejector by means of which electrodes are supplied from the magazine to the aligner, and the driving connection between the ejector and the shaft by which it is propelled to and from its retracted position illustrated. Fig. 4 is a partial top view of the magazine of Fig. 3 illustrating the electrode cells therein, Fig. 5 is a sectional view along lines 5—5 of Fig. 3, and Fig. 6 is a front view of the ejector of Fig. 3 with lower portions thereof broken away. Fig. 7 is a sectional view along the lines 7—7 of Fig. 3, and Fig. 8 is a sectional view along lines 8—8 of Fig. 3. Fig. 9 is a view along lines 9—9 of Fig. 8, and Fig. 10 is a sectional view along lines 10—10 of Fig. 8. Fig. 11 is a detailed illustration of the upper end of the ejector illustrating the electrode engaging contact, its biasing means, the electrode tongs, and the electromagnet for operating these tongs to move a unit length electrode against the bias of the electrode engaging contact. Fig. 12 is a sectional view along the lines 12—12 of Fig. 11, and Fig. 13 is a sectional view along lines 13—13 of Fig. 11. Fig. 14 is a side view and Fig. 15 is a sectional view along lines 15—15 of Fig. 14 illustrating the means for propelling the ejector and the slip clutch and lost motion connection between the driving and driven members thereof. Figs. 16 and 17 are plan views of a portion of the magazine illustrating the adjustments provided between the fixed and movable side walls of the electrode cells for accommodating electrodes of different sizes. Figs. 18 and 19 are detailed views taken at right angles to one another and illustrating the structure of the electrode limit switch whose operating member is in the path of travel of electrodes ejected from the magazine. Figs. 20, 21, and 22 are detailed views of the aligner previously mentioned, Fig. 20 being a side view thereof, Fig. 21, a sectional view along lines 21—21 of Fig. 20, and Fig. 22, a top view thereof. Figs. 23a and 23b diagrammatically illustrate the magazine control circuits, auxiliary power control circuits, and the welding control circuits for operating the complete mechanism illustrated in Figs. 1 and 2.

In accordance with the illustrated embodiment of my invention, unit length electrodes, stored side by side and on end in radially disposed cells forming part of an annular magazine, are fed one at a time from the magazine into end to end engagement with the electrode column in its feeding means. The foremost electrode in each cell is biased sidewise into engagement with a guide which is spaced relative to the other guides for the other cells of the magazine circumferentially around the inside surface of the inner wall of the magazine. The electrodes are fed from the magazine by an ejector which is slidably mounted on a support which extends through the central opening in the annular magazine. Upon movement from its retracted position this ejector first rotates the magazine to position a different one of the cells in electrode ejecting position and thereafter engages, through a spring biased contact thereon, the foremost electrode of the cell which has been moved to electrode ejecting position. Thereafter, the ejector moves this unit length electrode past the operating member of a trigger switch and into an aligner to make engagement with the trailing end of the electrode column in the feeding mechanism when this trailing end is within an arcing chamber forming part of the aligner. Upon engagement of the unit length electrode with the electrode column, the driving motor for the ejector is reversed but the ejector does not reverse immediately due to the lost motion connection in its drive. During this rest period before the ejector reverses its travel, an electromagnet on the ejector operates tongs whose jaws engage the ejected electrode and move it against the bias of the ejector contact which engages the end of the electrode. This separates the unit length electrode from the electrode column to strike an arc between their ends, and after a predetermined time interval, the flow of arc welding current is interrupted, the electromagnet is deenergized to release the tongs, and the bias imparted to the unit length electrode by the ejector contact again forces it into engagement with the electrode column to form a weld. In addition to the limit switch above referred to, there are two other limit switches actuated by the ejector. These limit switches form part of the magazine control circuit. Other features of the structure involved and the control for operating it will now be described in greater detail.

As shown in Figs. 1 and 2, apparatus embodying my invention comprises an annular or hollow cylindrical magazine 1 in which unit length electrodes are stored side by side and on end in eighteen cells radially disposed between the inner and outer side walls of the magazine, the arrangement being shown more in detail in Figs. 3, 4, and 7. These unit length electrodes are fed one at a time from the magazine by means of an ejector mechanism 2 into engagement with an electrode column formed by welding these unit length electrodes in end to end engagement. The feeding means for this electrode column is shown at 3 and may have the construction illustrated and claimed in U. S. Letters Patent 2,272,158, Jasper E. Anderson, granted February 3, 1942, and assigned to the assignee of this invention.

The magazine 1, ejector mechanism 2, and electrode feeding means 3, are all supported on a frame 4, which will hereinafter be referred to as an adapter because of its function correlating the several parts of my apparatus in operative relationship to one another. This adapter 4 is pivotally supported for partial rotation about a shaft journaled in the arms 5 of a bracket 6 which is mounted on a travel carriage 7 by which the apparatus is traversed along the desired line of welding. The bracket 6 comprises a hollow bearing block 8 which is journaled on the end of a shaft 9 mounted on the top of the travel carriage 7 and a face plate 10 which engages the front side of the travel carriage 7. The face plate 10 is provided with radial slots through which the bolts of attachment extend into the frame of the travel carriage 7, the arrangement being such that the bracket may be adjusted about the axis of rotation formed by the journal between bearing block 8 and support shaft 9. Support shaft 9 and face plate 10 are electrically insulated from the frame of the travel carriage 7 by sheets of insulating material 11 and 12.

The travel carriage 7 is provided with rollers which engage and move along a track formed by the parallel bars 13 which are attached by brackets 14 to a suitable support. A travel motor mounted on the travel carriage propels it lengthwise of the track 13.

Oscillatory movement is imparted to the adapter 4 through the agency of motor 15 mounted on a plate 16 attached to the face plate 10 of bracket 6. This motor, through a built-in gear reduction 17, rotates a crank shaft 18 and an adjustable crank 19 mounted thereon to impart oscillatory movement to the frame 4 through a lever mechanism also shown in Figs. 7, 8, 9, and 10. This lever mechanism will be further described below.

The automatic arc welding apparatus illustrated in Figs. 1 and 2 is adapted for feeding flux coated electrode material and a cutter mechanism 20 has been shown for cutting, lengthwise of the electrode column, a slot which bares the electrode core for supplying current thereto through a contact mechanism 21. The cutter mechanism 20 is supported on the frame of the feeding mechanism 3 by which the electrode column is fed therethrough and the contact mechanism 21 in turn is supported on the frame of the cutter mechanism 20.

Any suitable cutter mechanism may be employed and the one illustrated in outline in Figs. 1 and 2 has the construction described and claimed in my application, Serial No. 763,555, filed July 25, 1947, assigned to the assignee of this invention and now U. S. Letters Patent No. 2,475,346, granted July 5, 1949. As there described, the cutter mechanism comprises a disc type grinding wheel which is rotated by motor 22 and enclosed within a box 23 from which the cutting dust may be extracted by a suitable vacuum system not shown. The cutter mechanism embodies a slot calipering mechanism which moves the motor 22 and the grinding wheel supported on its shaft toward the electrode column to compensate for the wear of the grinding wheel. When the slot depth decreases a predetermined amount, the calipering mechanism operates a switch which energizes a solenoid enclosed in box 24 to operate a ratchet fed mechanism 25. When the welding wheel has been substantially consumed, the travel of the motor 22, on whose shaft it is mounted, operates a limit switch which may be employed to arrest operation of the arc welding apparatus in accordance with the control to be described below.

The contact mechanism 21 comprises a plurality of brushes 26 which extends through the slot formed by the cutter mechanism 20 and into engagement with the bared surface of the electrode core at the bottom of the slot. The electrode column is supported against the thrust of the brushes 26 by means of shoes 27. One terminal of the main source of arc welding current is connected to the brushes 27 and the other terminal thereof is connected to the work being welded. One type of contact mechanism which may be employed is described and claimed in my application Serial No. 794,717, filed December 30, 1947, assigned to the assignee of this invention and now U. S. Letters Patent No. 2,468,583, granted April 26, 1949.

An operator's station or control box 29 is supported on brackets attached to the lower part of the adapter 4. This control station comprises a plurality of push buttons, a selector switch, rheostats for controlling arc voltage, travel speed and speed of oscillation, as well as a meter for indicating the voltage of the main welding arc. By reason of the location of this operator's station, the control of the welding operation is at the operator's fingertips.

The construction of the hollow cylindrical magazine 1 is shown in Figs. 3, 4, 7, 16 and 17. It comprises a base 30 having inner and outer side walls 31 and 32. The inside surface of the inner side wall is provided with a plurality of circumferentially spaced electrode guides 33 which extend lengthwise thereof and engage the side surfaces of the foremost unit length electrode 34 located in each of the cells 35 into which the interior portion of the magazine is divided.

Each of the magazine cells 35 is formed by cooperating stationary and adjustable partitions 36 and 37 which extend radially in the magazine as best shown in Figs. 16 and 17. The inner edge of each of the stationary partitions 36 is inserted in a slot formed in the inside surface of the inner wall of the magazine and located on one side of the guides 33 thereof. Its outer edge is engaged by a clip 38 which extends through a perforation in the outside wall 32 of the magazine. The cooperating adjustable partition 37 of each of the cells has a turned over edge portion 39 at its lower edge which rests on the inside surface of the magazine base 30 and it is positioned relative to its cooperating fixed partition 36 by being mounted by upper and lower parallel linkages 40 extending between each adjustable partition and the next adjacent fixed partition of the next cell. A spring 41, one end of which is hooked into a hole in clip 38 and the other end of which is hooked into a hole in a lug 42 attached to partition 37, biases this partition into engagement with a pair of adjusting screws 43 threaded into the side wall 32 of the magazine and having inner ends engaging brackets 44 also attached to the partition 37 at locations adjacent the linkages 40. As shown in Figs. 16 and 17, the inner edge 45 of the adjustable partition 37 is flared outwardly so as to direct the smaller size electrodes into the guide 33 at the inner end of the partition. It will be noted that each of these guides is located opposite discharge openings 46 extending through the magazine base 30. It will also be noted that the upper edges of the cell-forming partitions have overturned and lapping upper edge portions which are inclined downwardly in order to direct the loading of electrodes into the cells.

The electrodes in each of the cells are held in side by side relationship with one another and biased toward the guide 33 at the inner end of the cell by a cell finger 47 (Fig. 3) which is pivotally supported in a yoke 48 mounted on a clip 49 which latches over the upper edge of the outer wall of the magazine and is held in place thereon by a fastener 50. As shown in Fig. 5, the pivotal support is formed by the threaded engagement of the finger with the shank portion of an adjusting screw 51 which extends through unthreaded holes in the yoke 48. By turning screw 51, the fingers 47 may be adjusted to a central location in the electrode cells, which as previously described, are adjustable to accommodate electrodes of different sizes. Each finger is provided with an operating arm 52 to which a bias is imparted to the finger by means of a spring 53 one end of which is hooked into a hole in arm 52 and the other end of which may be adjustably hooked into a series of holes formed in the side wall 32 of the magazine.

The magazine 1 is supported on the top plate of the adapter 4 for rotation about its longitudinal axis through the agency of a ring bearing 54 located between this top plate of the adapter and the bottom 30 of the magazine. The magazine is held in position on the adapter by four hold-down rollers 55 which engage the edge of the bottom 30 of the magazine which extends beyond its outer side wall 32. Each of these hold-down rollers 55 is supported on bearings mounted in brackets 56 which are attached to the top plate of the adapter 4.

The magazine 1 is rotated to position each of its cells in electrode ejecting position by means of an ejector 57 which is guided lengthwise of two T-shaped members 58, the lower ends of which are bolted to two center support members 59 located within the adapter 4 and also bolted to side plates 60 extending between the top and bottom plates of the adapter of which they form an integral art by being joined thereto by means of arc welding. Triangular bracing plates 61 welded to the top and bottom plates of the adapter and to the side plates 60 are also provided in order to add rigidity to the adapter structure. The supporting structure for the ejector guides 58 is apparent from an inspection of the sectional view of Fig. 8.

As shown in Fig. 3, the ejector guides 58 extend upwardly through an opening in the top plate of the adapter 4 and through the central opening of the magazine 1. The top ends of these ejector guides are connected and spaced by a crown plate 62 which, as shown in Figs. 1 and 2, is provided with an eye bolt 63 by means of which the complete apparatus may be lifted. The bottom plate of the adapter is also provided with an opening through which the ejector may pass in its downward travel along its guides 58.

As shown in Figs. 3, 6, and 12, the ejector 57 comprises a backslide 64, a spacer 65, and upper and lower front slides 66 and 67. These parts are held together by bolts as illustrated. The upper front slide is insulated from the ejector by a strip of insulating material 68. The lower front slide serves as a mounting for a cam support 69 on which a parallel track index cam 70 is supported.

The index cam 70 of the ejector 57 engages a cam follower 71 (Figs. 3, 6, and 7) which is rotatably supported on a slide 72 which is movable lengthwise of guide bars 73 the ends of which are attached to the flanged portions of the ejector guides 58. This block 72 also supports a ratchet or pawl 74 which is spring biased into engagement with notches 75 (Fig. 7) extending lengthwise of the outside surface of the inner wall 31 of the magazine. These notches are circumferentially spaced from one another around the magazine wall 31 by a distance such that the movement imparted to the magazine therethrough is sufficient to move the magazine by the distance between adjacent electrode guides. That is, each time the ratchet is operated by the initial travel of the ejector from its retracted position, the magazine is rotated in order to position a different cell of the magazine in electrode ejecting position wherein its electrode guide positions the unit length electrode in the cell in end alinement with the electrode column in the electrode feeding means 3.

The magazine is locked in each of its electrode ejecting positions by a latch 76 which is pivotally supported on a frame 77 attached to the flanged portions of the ejector guides 58 as best shown in Fig. 3. This latch is held in locking position with an aligned latch 75 of the magazine by a spring 78 and is moved from its locking position by a cam 79 attached to the ejector when this cam engages the operating roller 80 mounted on the latch 76. The length of the cam 79 in its position on the ejector 57 is such that the latch 76 is moved from its locking position just before and during the time that rotary motion is imparted to the magazine by the pawl mechanism previously described. After the magazine has been moved to a new electrode position, latch 76 holds the magazine in this position during the remainder of the forward travel of the ejector.

The ejector is propelled lengthwise of its guides 58 from and to its retracted position by means of a gear 81 which engages a rack 82 extending lengthwise of the ejector. This gear 81, as shown in Fig. 15, is splined to a driven shaft 83 mounted in bearings 84 which are supported on the ejector guides 58 by angle members 85 (Figs. 3 and 4). Driven shaft 83 is provided with a slip clutch 86 having a driving pin 87 which is engaged by the projecting arms 88 and 89 of a lost motion coupling 90 which is attached to a driving shaft 91. The arm 88 of the lost motion coupling 90 forms part of a ring 92 which is rotatably adjustable about the hub 93 for the arm 89 of the coupling. The hub 93 is attached to the driving shaft 91 by a set screw 94 and the ring 92 is held in adjustable position on the hub 93 by another adjustable set screw 95. When the arm 88 engages the pin 87, the ejector is moved in a downward direction, and when the arm 89 engages the pin 87, the ejector is moved in an upward direction.

As shown in Fig. 8, the driving shaft 91 is connected through a gear reducer 96 and a belted connection 97 to the drive shaft 98 of the motor 99. The magazine motor 99 and gear reduction 96 are mounted on the bottom plate of the adapter 4.

As shown in Figs. 11 and 12, the upper front slide 66 of the ejector constitutes a support for the spring biased metallic contact 100 by means of which the foremost unit length electrode is ejected from that cell of the magazine which is in electrode ejecting position and by means of which current is supplied to this electrode for welding it to the electrode column. Jaws 101 mounted on the lower ends of a tong mechanism 102 engage the upper end of the electrode in engagement with contact 100 and move it against the bias of this contact when the tongs are operated by the solenoid 123.

Ejector contact 100 is disc shaped and provided with an offset tapered shank which engages and is held in place in a correspondingly tapered hole in the contact arm 103. This arm is mounted on a rod 104, the ends of which extend through guides in the arms 105 and 106 of brackets 107 and 108 mounted on upper front slide 66. The contact arm 103 is biased to a predetermined position relative to these bracket arms by springs 109 and 110. Bracket 107 is also provided with a circular abutment 111, the front portion of which is slotted to form a guide for contact arm 103. This abutment 111 also constitutes a support for a spring collar 112 of the tong mechanism 102 and is biased into engagement therewith by a spring 113 one end of which rests in a groove formed in the upper surface of collar 112 and the other end of which rests against a spring retainer 114 which, in turn, abuts the arm 106 of bracket 108. A hollow cylindrical guide 115 forming part of the contact arm assembly serves as a guide for collar 112.

The tong mechanism 102 is formed by two parallel pairs of crossed levers 116 which are hinged about pins 117 projecting from collar 112. The lower ends of these pairs of levers constitute supports for the electrode engaging jaws 101, and the upper ends of these levers are connected by links 118 and pins 119 to the head portion 120 of the armature 121 of the solenoid 123. Spacers 122, located on the connecting pins 119 joining links 118 with the upper ends of tong levers 116, cooperate with pins 117 on collar 112 in providing the parallel spacing of the arms 116 of the tong mechanism. Solenoid 123 is provided with an operating coil 123' having its ends connected to terminals 124 and 125 mounted on the ends of a strip of insulating material 126, the central portion of which is supported on the frame of the solenoid 123. Terminal 124 is connected by a flexible conductor 127 with the rod 104 on which the contact 100 is supported through the agency of contact arm 103. The other terminal 125 is connected with a flexible conductor 128 through which arc welding current is supplied to contact 100 for forming the arc welded union between the unit length electrode engaged thereby and the welded electrode column in the feeding means.

The frame of solenoid 123 is attached to the upper front slide 66 of the ejector by means of bolts 129 having their ends in threaded engagement therewith. Clamping pressure is applied to the solenoid frame through collars 130 acted on by jam nuts 131 threaded on bolts 129. The inner ends of bolts 129 engage the insulating strip 68, and by an adjustment of bolts 129, a controlled braking action between the ejector and its support may be obtained.

The jaws 101 of the tong mechanism 102 are cylindrical in shape and provided with offset shank portions 132 which extend through corresponding pairs of clamping blocks 133 at the lower ends of levers 116 of the tong mechanism. A portion of the shank of each clamping jaw makes a threaded engagement with one of the clamping blocks 133 so that the amount by which the jaws 101 project from the tong mechanism 102 may be adjusted. The eccentric arrangement of the jaws 101 on their shanks permits relative spacing of these jaws in order to accommodate electrodes of different sizes. The front ends of the jaws are provided with slots in order to accommodate the bit of a screw driver which may be employed for turning them in order to secure the adjustments referred to. As previously noted, the projection of contact 100 from its mounting arm is also adjustable by reason of its offset supporting shank. A proper adjustment of the jaws 101 and contact 100 provide for suitably engaging the top end of a unit length electrode in one of the magazine cells without overlapping and engaging the next adjacent electrode in the cell.

As shown in Fig. 3, the electrodes ejected from the magazine 1 pass through the central opening in the top plate of the adapter 4 into an aligner 134 which is supported on the bottom plate of the adapter for limited movement relative thereto. This adapter is located between two of the side plates 60 of the adapter and its movement in an outward direction from the adapter may be limited by a bracket 135 having an adjusting screw 136 which engages the aligner. When performing its intended purpose, the bottom portion of this adapter engages the trailing end of the electrode column being fed by the feeding means and the upper portion engages the leading end of the electrode ejecting from the magazine and aligns it for end to end engagement with the trailing end of the electrode column when these ends come together within the arcing chamber of the aligner.

The construction of this aligner is illustrated in Figs. 20, 21 and 22. As shown in these figures, the bottom portion of the aligner comprises two relatively movable members 137, each of which supports a pair of grooved electrode engaging guide rollers 138 which are mounted for rotation between the side plates thereof. These members are biased toward one another by a pair of springs 139 located on opposite sides thereof and having their ends respectively attached to the members 137. These springs are protected against weld spatter by tubular covers 140. The relative movement of members 137 is controlled by guides 141 one end of each of which is attached to one of the members 137 and the other end of each of which is turned over to engage the sides of the other member 137. A guide slot is also provided at this end of the guide members to engage the projecting end of a spacing stud by which the side plates of this other member are connected. The top portion of this aligner comprises two relatively moveable members 142 which are hinged at 143 on the lower members 137. Each of these upper members supports a grooved electrode engaging roll 144. These upper members 142 and their electrode engaging rolls 144 are biased toward one another by a pair of springs 145 located on opposite sides thereof and having their ends attached thereto. Springs 145 are also protected from weld spatter by tubular covers 146. The relative movement of members 142 toward one another is limited by adjusting screws 147, the ends of which are threaded into brackets attached to these members and the midportion of which passes through oversized openings in limit plates 147' against the outside surface of which the heads of these screws rest. The bottom ends of limit plates 146 are attached to the outer edges of the bottom members 137.

An arcing chamber is formed in the space between the lower members 137 and upper members 142 of the aligner by sheets of material 148 which are attached to these members and have a shape to provide such arcing chamber. As shown in Fig. 20, the leading end of a unit length electrode 149 and the trailing end of the electrode column 150 in the feeding means have been shown in the position they occupy within the arcing chamber. It will be noted that the bottom members 137 through their electrode engaging rolls 138 position the aligner in the adapter in accordance with the position of the trailing end of the electrode column 150 therein and that the upper members 142 acting through their electrode engaging rolls 144 position the leading end of the new length of electrode material 149 in proper alignment for the welding operation which is performed between their ends within the arcing chamber.

As shown in Figs. 3 and 8, the operating arm 151 of a limit switch mechanism is positioned in the path of travel of electrodes from the magazine, by mounting its enclosing and supporting casing 152 on one of the side plates 60 of the adapter 4. The construction of this limit switch mechanism is shown in Figs. 18 and 19. It comprises a support 153 which is attached to the casing 152 and on which is mounted a parallel linkage 154 for the operating arm 151. This linkage is biased by a spring 155 to engage the operating member of a switch 156 which is bodily adjustable relative thereto by means of an adjusting screw 157.

As shown in Figs. 8 and 14, a limit switch 158 is mounted on top angle member 85 and has an operating member 159 which is in the path of travel of a cam 160 which is mounted on the ejector. This cam 160 is also shown in Fig. 6.

Limit switches 156 and 158 form part of the magazine control circuit which will be described below.

As previously stated in connection with the description of Figs. 1 and 2, the adapter frame 4 is mounted on the arms 5 of the bracket 6 for oscillatory movement thereon. As previously described, this oscillator mechanism comprises a driving motor 15 which is connected to a crank shaft 18 through a gear reduction 17 in order to impart rotation to an adjustable crank 19. Referring now to Figs. 7, 8, 9, and 10, in addition to Figs. 1 and 2, it will be noted that the adjustable crank 19 comprises a face plate having a dovetail slot along which a T-bar extension of the crank pin 161 is adjustable in order to vary the throw of the crank. This crank pin is journaled in one end of a lever 162, the other end of which is pivotally attached at 163 to an arm 164. This arm 164 and another arm 165 are clamped to a torque tube 166 mounted on a shaft 167, the ends of which are journaled in the outer ends of the arms 5 of the support bracket 6. The outer end of the other arm 165 is pivotally connected at 168 to a lever 169, the other end of which is provided with a collar 170 which encircles the eccentric 171.

This eccentric 171 is provided with an axle 172 which extends into a gear reducer 173 mounted on the bottom plate of the adapter 4. Motion is imparted to the axle 172 through the agency of a gear reducer by means of a shaft 174. The outer end of this shaft is provided with a sprocket 175 (Figs. 1 and 2) which is connected by a chain 176 to another sprocket 177 mounted on a shaft which is journaled in a yoke 178 which is attached to the frame of the feeding means 3. The outer end of this shaft for sprocket 177 is provided with a hand wheel 179. It will thus be noted that the operator, by rotating the hand wheel 179, can adjust the position of the eccentric 171 relative to the adapter 4 and that this adjustment will position the adapter relative to the oscillator mechanism. The pivots 163 and 168 are formed, as shown in Fig. 10, by two mating members which may be moved relative to one another by a connecting bolt in order to take up for lost motion resulting from wear. One of the mating members may be made of a relatively soft metal such as brass and the other of a harder metal such as steel or cast iron.

As shown in Fig. 9, the crank 19 is keyed to the lower end of the crank shaft 18 which is journaled in a bearing 180 mounted on one of the arms 5 of bracket 6. The upper end of this crank shaft 18 is frictionally engaged by one end of a clamping sleeve 181 (Fig. 2), the other end of which is key connected to the output shaft of the gear reducer 17. The slip connection thus provided between sleeve 181 and crank shaft 18 prevents damage to the oscillator motor should the adapter 4 engage an obstruction located in its path of travel.

The mechanism within the adapter 4 is for the most part enclosed by cover plates 182. The adapter also supports a panel 183 for the electrical connections forming part of the control circuit which will now be described.

The control circuits for the apparatus shown in Figs. 1 and 2 have been diagrammatically illustrated in Figs. 23a and 23b. For the most part, the upper portion of Fig. 23a illustrates the magazine control circuits, the middle portion thereof, the auxiliary power control circuits, and the bottom portion thereof, the welding control circuits. Fig. 23b shows the amplidyne motor-generator set, the excitation fields for the amplidyne, and the parallel connections from the output terminals of the amplidyne to the armatures of both the magazine motor and the feed roll motor.

In the lower right hand portion of Fig. 23b, the electrode column 150 has been illustrated between the feed rolls 184 of the feeding means 3. These feed rolls 184 are driven by the armature 185 of an electrode feed motor having a field 186. In order to tie the disclosure in Fig. 23b with that in the previous figures, the reference numeral 3 has been associated with the dot and dash line indicating the connection between the said rolls 184 and armature 185 thereof. The armature 185 of the electrode feed motor is connected to the output brushes of an amplidyne generator 187 which is driven by a motor 188 which is connected with a source of three-phase alternating current by a contactor 189 having an operating winding 190. This motor 188 also drives a direct current exciter 191 across which the field 186 of the electrode feed motor is connected.

The amplidyne control is of the type described and claimed in U. S. Letters Patent 2,311,462, Frank C. Neal, Jr., granted February 16, 1943, and assigned to the assignee of this invention. For automatic operation, the control field 192 of the amplidyne is connected to be responsive to the difference in voltage of a comparison circuit including resistors 193 and 194. Its bucking field 195 is connected across the output brushes of the amplidyne through a Thyrite resistor 196 and a rectifier 197. A stabilizing capacitor 198 is connected across the Thyrite resistor, and the polarity of the rectifier is such as to pass current through the bucking field 195 when the right hand output brush of the amplidyne is of positive polarity as when energizing the feed motor 185 for electrode feed toward the work.

For manual operation, the armature 185 of the electrode feed motor is connected to the output brushes of the amplidyne 187 through manuable operable "raise" and "lower" push button switches 199 and 200 and the control field 192 of the amplidyne is connected across the output brushes of the exciter 191 through resistors 193, 201, and 202. A transfer relay 203 shown in the lower right hand portion of Fig. 23a is employed for changing from manual to automatic operation of this amplidyne control. This relay has an operating winding 204, contacts 205 and 206 for switching the comparison circuit in and out, contacts 207, 208, and 209 for switching the raise and lower manual switches in and out of circuit, and contacts 210 for controlling the grinder solenoid 211 of the cutter mechanism previously described as being employed for cutting a longitudinal slot in the flux coating of the electrode column in order to bare its core. This grinder solenoid 211 is enclosed within the box 24 shown in Fig. 1.

Resistor 194 of the comparison circuit above referred to and its slider constitute a potentiometer having its input terminals connected across the brushes of exciter 191 through resistor 202. The voltage drop across the righthand portion of the resistor 194 is matched against the voltage drop across the resistor 193. During welding the drop across this righthand portion of this resistor 194 is less than that across resistor 193.

The terminals of resistor 193 are connected to the output terminals of a rectifier bridge 211 having its input terminals connected across the welding arc or the gap between the electrode column 150 and the work being welded 212. This rectifier bridge is employed so that with alternating or direct current of either polarity connected across the electrode column 150 and the work 212, the upper terminal of resistor 193 is always at positive polarity.

The welding arc between the electrode column 150 and work 212 is in the arrangement illustrated supplied with alternating current through the secondary of a welding transformer 213 whose primary is connected through the contacts 214 of a contactor 215 to a source of alternating current supply. The contactor 215 is provided with an operating winding 216.

A source of direct current supply is connected through switches 217 and circuit 218 to the unit length electrode 149 in the ejector and to the electrode column 150 in the feeding means (see Fig. 20) for joining their abutting ends by arcing welding as above described. The operating winding 123' of the solenoid 123 on the ejector is shown connected in circuit 218 as is the operating coil 219 of a relay 220 and the contacts 221 of a relay 222 forming part of the magazine control circuits illustrated in the top portion of Fig. 23a. It will be noted that one terminal of each of the magazine welder supply and the welding arc supply is connected together and to the brush mechanism of Fig. 1 which has been illustrated in Fig. 23b as a single contact 21.

The armature 223 of the magazine motor 99 is connected through reversing switches 224 (upper righthand portion of Fig. 23a) across the output brushes of the amplidyne 187 and in parallel to the series circuit through the feed motor armature 185 and adjustable resistor 225. These reversing switches are provided with operating windings 226 and 227 which, when energized respectively, control the direction of rotation of the magazine motor 99 for feeding the ejector to and from its retracted position. The field 228 of the magazine motor is connected across the output terminals of the exciter 191.

Referring now to Fig. 23a, it will be noted that the several control circuits are connected for energization across supply conductors 229 and 230 which are energized through a pair of switches 231 by which they are connected to the secondary of a transformer 232 whose primary is connected to the power supply.

An initiating relay 233 has its operating winding 234 connected across supply conductors 229 and 230 through parallel connected contacts 156a and 158a of limit switches 156 and 158. Limit switch 156 is the previously described electrode switch which is located between the magazine 1 and the aligner 134 which is located in the adapter 4. Limit switch 158 has been previously referred to as being operated in response to the travel of the ejector. It has a second pair of contacts which are connected in circuit with the operating winding 235 of a relay 236 across conductors 229 and 230. The initiating relay 233 has normally open contacts 237 and 238, respectively connected in circuit with the operating winding 227 of the reversing switch 224 and the operating winding 239 of the previously mentioned relay 222 having contacts 221 controlling the supply of welding current by which unit length electrodes are welded to the electrode column upon being rejected from the magazine 1. Relay 236 is a timer control relay having contacts 240, 241, 242, and 243. The timer controlled thereby is shown at 244 and is an electronic timer embodying the construction described and claimed in U. S. Letters Patent 2,171,347, Elbert D. Schneider, granted August 29, 1939, and assigned to the assignee of this invention.

The electronic timer 244 comprises a relay 245 having its operating winding 246 connected across the supply conductors 229 and 230 through the anode-cathode circuit of a controlled arc discharge device 247 and contacts 243 of relay 236, contacts 248 of a transfer relay 249, and contacts 250 of the magazine welder current responsive relay 220. The arc discharge device 247 has a control element 251 and its control circuit therefor is completed through a timing capacitor 252, the upper portion of a potentiometer resistor 253, and resistors 254 and 255. The timing capacitor 252 is provided with a discharge resistor 256 which is connected across its terminals. When the anode-cathode circuit of arc discharge device 247 is opened at relay contacts 243, 248, or 250, timing capacitor 252 is charged by current flow from control element 251 to the cathode of arc discharge device 247 through a circuit including the lower portion of potentiometer resistor 253 and resistor 255 which are connected between supply conductors 229 and 230. This current flow occurs during negative half cycles of the supply; that is, when supply conductor 229 is at positive polarity. The resulting charge on the capacitor 252 is such as to impress a negative hold off voltage on the control element 251 of arc discharge device 247. The charging of timing capacitor 252 is arrested when the anode-cathode circuit of arc discharge device 247 is completed through relay contacts 243 and 250 and after a time interval depending upon the value of discharge resistor 256, arc discharge device 246 becomes conducting to energize the operating winding 246 of relay 245 causing this relay to pick up and open its normally closed contacts 257 and to close its normally open contacts 258. The charge on capacitor 252 is adjusted by adjusting the slider of potentiometer 253. The discharge resistor 256 for this capacitor, although shown as a fixed resistor, may be an adjustable resistor in order to provide an additional adjustment of the timing interval. Capacitor 259 connected across operating winding 246 of relay 245 acts to smooth out the pulsating current supplied to this operating winding through the arc discharge device 247.

Transfer relay 249 is provided with an operating winding 260 connected across the supply conductors 229 and 230 through contacts 241 of relay 236 and contacts 257 of relay 245. Relay 249 is provided with sealing-in contacts 261 and transfer contacts 262, 263 and 248. The relay 220 having its winding 219 connected in series with the magazine arc welder supply circuit 218, has contacts 264 and 265 in addition to contacts 259 previously referred to.

The magazine welder supply circuit 218 is opened at the end of the timing interval imposed by timer 244 by operation of a relay 266 having an operating winding 267 and contacts 268. Its operating winding 267 is connected across the supply conductors 229 and 230 through contacts 242 of relay 236 and contacts 258 of relay 245. Its control contacts 268, in conjunction with the control contacts 238 of relay 233 and contacts 269 of a "magazine weld" push button or contacts 306 of a relay 302, connect the operating winding 239 of relay 222 across the supply conductors 229 and 230.

The up and down windings 226 and 227 of the reversing switch 224 for the magazine motor 99 are connected across the supply conductors 229 and 230. The circuit through the down winding 227 is completed from conductor 230 through a manually operable switch 230' and the contacts 237 of relay 233, the contacts 264 of relay 220 and the contacts 262 of relay 249 to supply conductor 229. The circuit through the up winding 226 is completed from supply conductor 230 through switch 230', contacts 265 of relay 220 or contacts 263 of relay 249, and contacts 240 of relay 236 to the other supply conductor 229.

Supply conductors 229 and 230 are connected to supply conductors 270 and 271 for the auxiliary power control and welding control circuits by contacts 272 and 273 of a master relay 274. The operating winding 275 for this relay is connected across supply conductors 229 and 230 through the contacts 276 of a "start" push button, the contacts 277 of an overload relay 278 and the contacts 279 of a "stop" push button. The relay 274 is also provided with sealing-in contacts 280 which are connected across the contacts 276 of the start push button. This start push button also has contacts 281 which complete the armature circuit of the grinder motor 282 of the cutter mechanism 20 of Figs. 1 and 2. These contacts are connected in shunt circuit with the operating winding 283 or relay 278, and after the start push button has been released the armature current for the grinder motor 282 is supplied through this operating winding 283. Consequently any overload on the grinder motor will cause relay 278 to operate, opening its contacts 277 and thereby deenergizing supply conductors 270 and 271 for the auxiliary power control and welding control circuits. The overload relay 278 is one of several relays having contacts in circuit with the operating winding 275 of the master relay 274, but in order to simplify the drawing the connections of only this one protective relay have been illustrated. The operating winding 211 of the solenoid operated ratchet feed for the grinding wheel of the grinder mechanism 20 of Figs. 1 and 2 is connected across supply conductors 270 and 271 through the contacts 210 of transfer relay 203 and the contacts 284 of a switch operated by the slot caliper of the grinder mechanism 20.

The operating winding 190 of the contactor 189 for the driving motor 188 of the amplidyne set is also connected across supply conductors 270 and 271 and is consequently energized to close its contacts after the master relay 274 has connected conductors 270 and 271 to conductors 229 and 230.

The welding control circuits are shown at the bottom of Fig. 23a. Automatic arc welding is initiated by closing the contacts 285 of a "weld start" push button. Closure of these contacts energizes the operating winding 286 of a time delay opening relay 287. The winding 286 of this relay is connected across the output terminals of a rectifier bridge 288 having its input terminals connected across supply conductors 270 and 271 through contacts 289 of a "weld stop" push button, the contacts 285 of the weld start push button, the contacts 290 of a selector switch also having contacts 291 and 292, a resistor 293 and the contacts 294 of a limit switch which is operated by the travel carriage 7 in its movement to an extreme position on its supporting tracks 13.

The travel carriage 7 also operates limit switches 295 and 296. Travel carriage movement to the right is arrested by operation of limit switch 295 and travel carriage movement to the left is arrested by operation of limit switch 296. Travel carriage movement to the right or to the left depends upon the energization of relays 297 and 298 which so long as energized complete an energizing circuit for the travel carriage motor. Since the travel carriage motor control circuits form no part of my invention, the drawing has not been complicated by their illustration. Relay 297 has an operating winding 299 which is connected across the supply conductors 270 and 271 through the contacts of limit switch 295, contacts 291 of the five-position selector switch, contacts 300 of the weld start push button and contacts 301 of a travel carriage relay 302. Relay 298 has an operating winding 303 which is connected across supply conductors 270 and 271 through the contacts of limit switch 296, contact 292 of the five-position weld selector switch and contacts 300 and 301 of the weld start push button and relay 302.

The five-position weld selector switch is provided to preset the operating program. The five positions of this selector switch with regard to the open and closed positions of its contacts 290, 291 and 292 are as follows:

| Switch Contacts | 290 | 291 | 292 |
|---|---|---|---|
| Travel left | Open | Open | Closed. |
| Weld left | Closed | do | Do. |
| Off | Open | do | Open. |
| Weld right | Closed | Closed | Do. |
| Travel right | Open | do | Do. |

In the drawing, the selector switch has been shown with its contacts operated for welding to the right, that is, with its contacts 290 and 291 closed and its contact 292 open.

When the contacts 285 of the weld start push button are closed, the operating winding 304 of the travel control relay 302 is connected across the supply conductors 270 and 271. In addition to its contacts 301 previously referred to, this relay 302 is also provided with sealing-in contacts 305 and contacts 306 shunting the contacts 269 of the magazine weld push button.

When the time delay opening relay 287 closes its contacts 307, it connects the operating winding 308 of relay 309 across the supply conductors 270 and 271. This relay 309 controls the automatic arc welding operation through its contacts 310 and 311. The operating winding 204 of transfer relay 203 previously referred to is connected across the supply conductors 270 and 271 through contacts 311 of relay 309, contacts 305 of relay 302 and contacts 289 of the weld stop push button, and contacts 310 of relay 309 connect the operating winding of the welding contactor 215 across the supply conductors 270 and 271.

Operation of the oscillator motor 15 is controlled by a two-position hand switch 312 which provides for automatic and hand operation thereof. This switch 312 controls the connection of the operating winding 313 of the oscillator motor relay 314 across supply conductors 270 and 271. The contacts 315 of this relay connect the oscillator motor to a source of supply as indicated, the field 316 of the motor being connected directly across the supply and the armature 317 thereof being connected across the supply through an adjustable rheostat 318.

The electrical control of Figs. 23a and 23b will now be further described by explaining its operation in controlling the operation of the automatic arc welding apparatus illustrated in Figs. 1 to 22, inclusive, and previously described.

In Figs. 23a and 23b the hand-operated switches have been shown in their open position and the push button switches in the positions to which they are normally biased. The relays and contactors have also been shown in their de-energized positions, and with the exception of 156 and 158 the limit switches have been shown with their contacts in the position they occupy before being mechanically actuated. Limit switch 156, identified in Fig. 23a as the "electrode switch," has been illustrated with its contacts 156a open by reason of the engagement of its operating member 151 with the trailing end of the electrode column, and contacts 158a and 158b of limit switch 158 have been illustrated in the positions they assume as a result of their operating member engaging the cam 160 on the ejector 57 when this ejector is in its retracted or up position.

The system is conditioned for operation by closing the magazine welder supply switch 217, the control circuit switches 231, the magazine control switch 230' and, if oscillation is desired, by closing the oscillator control switch 312 to the left for automatic operation. The five-position weld selector switch, as previously stated, has been illustrated with its contacts 290, 291 and 292 in the position they occupy for welding to the right, that is, for travel carriage movement to the right during welding.

When the ejector 57 is in its retracted or up position, and when the trailing end of the electrode column 150 in the feeding means 3 engages the operating member 151 of the limit switch 156, the contacts 156a of this limit switch and the contacts 158a and 158b of the ejector limit switch are in the positions illustrated in the upper left-hand corner of Fig. 23a. The closed contacts 158b of limit switch 158 complete an energizing circuit for the operating winding 235 of the timer control relay 236 across supply conductors 229 and 230, causing this relay to pick up and open its normally closed contacts 240, 242 and 243 and to close its normally open contacts 241.

The opening of contacts 243 of relay 236 opens the anode-cathode circuit of the arc discharge device 247 of the electronic timer 244, and the timing capacitor 252 is charged when supply conductor 229 is positive by current flow from this conductor through the lower portion of potentiometer 253, the control element 251 and cathode of arc discharge device 247 and resistor 255 to the other supply conductor 230. The capacitor 252 consequently acquires a charge which impresses a negative hold-off voltage on the control element 251 of the arc discharge device 247 which will render this device non-conducting for a predetermined time interval after its anode-cathode circuit is again completed.

The closure of contacts 241 of relay 236 energizes the winding 260 of transfer relay 249 by connecting it across the supply conductors 229 and 230 through a circuit including the normally closed contacts 257 of relay 245 of the electronic timer. Once relay 249 has been operated, the energizing circuit for its winding 260 is maintained through its sealing-in contacts 261. The pick-up of relay 249 causes it to close its normally open contacts 262, thereby preparing the energizing circuit of the down winding 227 of the reversing switch 224 for operation upon the closure of contacts 237 of initiating relay 233.

The auxiliary power and welding control circuits are energized by closing the contacts 276 of the start push button shown in the middle portion of Fig. 23a. Closure of these contacts completes the energizing circuit for winding 275 of master relay 274 through a circuit across the supply conductors 229 and 230. This energizing circuit also includes normally closed contacts 277 of overload relay 278 and the contacts 279 of the stop push button. Pick-up of the master relay 274 causes it to close its normally open contacts 272 and 273, thereby connecting supply conductors 270 and 271 for energization from supply conductors 229 and 230. Pick-up of this relay 274 also causes it to close its normally open sealing-in contacts 280 so that upon release of the start push button and the opening of its contacts 276, its energizing circuit is still maintained.

Energization of supply conductors 270 and 271 energizes the operating winding 190 of the line contactor 189 which closes its contacts to connect the motor 188 to its three-phase source of supply. Energization of this motor 188 initiates operation of the amplidyne generator set driven by this motor and including the amplidyne generator 187 and its exciter 191.

At the time contacts 276 of the start push button were closed by operation thereof, a second pair of its contacts 281 were also closed, connecting the armature 282 of the motor of the grinder mechanism 20 across the supply conductors 270 and 271. Upon release of this start push button and the opening of contacts 281 thereof, the grinder motor is thereafter energized through the operating winding 283 of the overload relay 278. With this arrangement the heavy starting current for the grinder motor is shunted around the operating winding 283 of the overload relay 278, thereby preventing operation thereof. Improper operation of the grinder mechanism which would result in overload of its motor will, upon release of the start push button, cause operation of the overload relay 278 to open its contacts 277 which will open the energizing circuit of the master relay 274 causing it to drop out and deenergize supply conductors 270 and 271.

The arc welding operation is initiated by closing contacts 285 of the weld start push button shown in the lower portion of Fig. 23a. The closure of these contacts 285 completes the energizing circuit of the time delay opening relay 287 from supply conductor 271 through contacts 289 and the weld stop push button, contact 290 of the weld selector switch, the rectifier bridge 288, resistor 293 and the travel carriage limit switch 294 since the operating winding 286 of relay 287 is connected across the output terminals of the rectifier bridge 288.

The closure of contacts 285 of the weld start push button also completes the energizing circuit for the travel carriage control relay 302. This circuit extends from supply conductor 271 through the contacts 289 of the weld stop push button, contacts 285 of the weld start push button, the operating winding 304 of relay 302 to the other supply conductor 270. Pick-up of relay 302 causes it to close its sealing-in contacts 305 so that subsequent release of the weld start push button will not deenergize it or relay 287. Pick-up of relay 302 also closes its normally open contacts 301 which are in circuit with the normally closed contacts 306 of the weld start push button contacts 291 of the selector switch when in the position illustrated, the operating winding 299 of the relay 297 and limit switch 295. This causes operation of the travel motor control circuit for propulsion of the travel carriage to the right. This circuit is not completed, however, until the weld start push button has been released permitting its contacts 306 to close and energize the travel right relay 297 by connecting the circuit across supply conductors 270 and 271. Thus, the operator can delay travel of the welding head relative to the work until a molten weld pool has been satisfactorily established.

Pick-up of relay 287 closes its contacts 307 connecting the operating winding 308 of the welding relay 309 across supply conductors 270 and 271. This relay 309, upon pick-up, closes its normally open contacts 310 and 311. The closure of contacts 310 connects the operating winding 216 of the welding contactor 215 across supply conductors 270 and 271. Closure of the welding contactor 215 connects the welding arc supply to the welding transformer 213 and thereby applies arc welding potential to the electrode column 150 and the work to be welded 212. Closure of contacts 311 of relay 309 operates the transfer relay 203 which prepares the amplidyne control circuit for automatic operation. This transfer relay 203 also prepares, through its contacts 210, the energizing circuit for the grinder solenoid 211 for operation in response to the actuation of the switch 284 by the slot caliper in the grinder mechanism. As previously stated, whenever the depth of the slot becomes less than a predetermined amount, the grinder switch 284 is closed, thereby energizing the grinder solenoid for operation of the ratchet feed mechanism which moves the grinder motor and its grinding wheel toward the electrode column a predetermined amount in order to re-establish the desired depth of the slot formed in the flux coating of the electrode column by the grinding wheel of the grinder mechanism.

With the oscillator switch 312 in its lefthand position for automatic operation, closure of contacts 301 by pickup of relay 302 will connect the operating winding 313 of the oscillator relay 314 across the supply conductors 270 and 271. This relay 314, by closing its contacts 315, connects the oscillator motor 15 to its source of supply, and operation of this motor will swing the adapter 4 to and fro about shaft 167 about which it is pivoted in the arms 5 of its supporting bracket 6. Bracket 6 supports the welding apparatus on the travel carriage 7 as previously described in connection with Figs. 1 and 2.

Assuming that the electrode column 150 is out of engagement with the work to be welded 212, closure of the welding contactor 215 will cause the full open circuit voltage of the secondary of the welding transformer to appear across resistor 193 of the voltage comparison circuit which also includes the righthand portion of the potentiometer 194. The voltage across resistor 193 will be greater than the voltage across the righthand portion of potentiometer 194, thereby causing current to flow through the control field 192 of the amplidyne from its terminal a to terminal b. This excites the amplidyne so that its righthand output brush becomes positive and supplies current to the electrode feed motor armature 185 through a circuit including contacts 208 of relay 203, adjustable resistor 225, and the normally closed contacts of the "lower" push button for the amplidyne to the left hand output brush of the amplidyne. This causes the armature 185 of the feed motor to rotate in a direction which will feed the electrode column 150 toward the work. During this feeding operation, the bucking field 195 of the amplidyne is excited since the rectifier in circuit therewith is poled to pass current when the right hand output brush of the amplidyne is positive. This will prevent the amplidyne from supplying excessive voltage to the armature 185 of the feed motor and, consequently, prevent it from feeding the electrode column 150 toward the work 212 at an excessive rate of speed.

When the electrode column 150 engages the work 212, the voltage drop across resistor 193 decreases so far that current flow through the control field 192 of the amplidyne reverses, thereby reversing the output voltage of the amplidyne and the direction of rotation of the armature 185 of the electrode feed motor. During this reverse feeding of the electrode column, very little bucking current flows through the amplidyne, thereby permitting a rapid withdrawal of the electrode column from the work to strike the welding arc. As soon as the welding arc attains a voltage slightly greater than the voltage across the right hand portion of the potentiometer 194 which is determined by the adjustment of its slider, current flow through the control field 192 of the amplidyne again reverses to cause the amplidyne to supply voltage of a polarity which will cause the armature 185 of the electrode feed motor to feed the electrode column toward the work in accordance with its consumption in the arc.

As the electrode column 150 is consumed in the arc, it moves relative to the electrode switch 156 and eventually the trailing end of this welded electrode column passes beyond the operating member 151 of the electrode switch 156. When this occurs, switch 156 closes its contacts 156a and connects the operating winding 234 of the initiating relay 233 across the supply conductors 229 and 230. Pickup of relay 233 causes it to close its normally open contacts 237 and 238. Closure of its contacts 237 completes the connection of the down winding 227 of the magazine motor reversing switch 224 across the supply conductors 229 and 230. This circuit extends from supply conductor 230 through switch 270, winding 227 of switch 224, contacts 237 of relay 233, contacts 264 of relay 220, and contacts 262 of transfer relay 249 which had been closed by the above described prior operation of relay 249 in response to the operation of relay 236.

The energization of the down winding 227 of the reversing switch 224 operates this switch to connect the armature 223 of the magazine motor 99 across the output brushes of the amplidyne 187 for rotation in a direction to feed the ejector from its retracted position. Adjustable resistor 225 in circuit with the armature 185 of the electrode feed motor also connected across the output brushes of the amplidyne provides a vernier adjustment of the relative speeds of the magazine motor and the electrode feed motor so that welding of the unit length electrode to the electrode column may be made to occur in the arc chamber. By reason of the connections, however, the speeds of these motors vary simultaneously and are proportional to one another according to the adjustment provided by resistor 225.

As the ejector 57 is fed from its retracted position, its contact 100 engages the upper end of the foremost unit length electrode in that magazine cell which is in electrode ejecting position. After a slight feeding movement of this unit length electrode, its leading end will engage the operating member 151 of the electrode switch 158, causing it to open its contacts 156a. This, however, does not deenergize the winding 234 of relay 233 since movement of the ejector from its retracted position causes limit switch 158a to close its contacts and limit switch 158b to open its contacts. This operation of these limit switches results from the movement of the cam 160 with the ejector relative to switches 158 which are mounted on the ejector guide members 58.

The opening of the contacts of limit switch 158b deenergizes the operating winding 235 of relay 236, causing it to drop out and close its contacts 240, 242, and 243. The closure of contacts 240 prepares a circuit for energizing the up winding 226 of the reversing switch 224 for the magazine motor 99. The closure of contacts 242 prepares an energizing circuit for the operating winding 267 of relay 266. The closure of contacts 243 prepares the trip circuit of timer 244 for completion upon closure of contacts 259 of relay 220.

The adjustments are such that the ejector feeds the leading end of the unit length electrode 149 from the magazine into engagement with the trailing end of the electrode column 150 when this trailing end is positioned within the arcing chamber of the adapter 134. Upon engagement of these ends, the magazine welder circuit 218 is completed since, as before noted, contacts 221 of relay 222 have already been closed by pickup of relay 233.

The flow of current in this magazine welder circuit 218 also causes relay 220 to pickup closing its contacts 259 and 265 and opening its contacts 264. The opening of contacts 264 deenergizes the down winding 227 of the reversing switch 224 of the magazine motor 99, and the closure of its contacts 265 completes the energizing circuit of the up winding 226 of this reversing switch 224. The magazine motor consequently reverses its direction of rotation, but the ejector 57 does not immediately reverse its travel due to the lost motion connection shown in Figs. 14 and 15.

The flow of current in the magazine welder circuit 218 also energizes solenoid 123' on the ejector, causing it to operate the tong mechanism 102 to close its jaws 101 on the unit length electrode 149 and move it against the bias imparted to ejector contact 100 by its biasing spring 110. This separates the unit length electrode from the welded electrode column to strike an arc, the duration of which is determined by the electronic timer 244. The closure of contacts 259 of relay 220 initiates this timing operation of the electronic timer 244 and after a short interval of time, which is of the order of a quarter to one-half of a second, relay 245 of this timer is operated to open its contacts 257 and to close its contacts 258.

Closure of contacts 258 of relay 245 completes the energizing circuit for the winding 267 of relay 266 through these contacts and the now closed contacts 242 of relay 236, causing relay 266 to pickup and open its contacts 268. The opening of contacts 268 of relay 266 deenergizes the operating winding 239 of relay 222 which thereupon opens its contacts 221 connected in the magazine welder circuit 218. The consequent interruption of current flow in the magazine welder circuit 218 deenergizes the solenoid 123' on the ejector, causing it to release the tongs 102 and free the unit length electrode 149 in the ejector for movement into engagement with the electrode column 150 under the bias imparted thereto by the ejector contact and its spring 110.

The opening of contacts 257 of relay 245 deenergizes the operating winding 260 of relay 249, causing it to close its contacts 263 and 248. Contacts 263 are connected in the energizing circuit of the up winding 226 of reversing switch 224 and in shunt to contacts 265 of relay 220, and contacts 248 are connected in the anode-cathode circuit of arc discharge device 247 and in shunt to contacts 250 of relay 220. Consequently, when relay 220 is deenergized by the opening of contacts 221 of relay 222, the energizing circuit through the winding 226 of reversing switch 224 and the energizing circuit of the electronic timer through contacts 250 is not interrupted by the opening of these contacts of relay 220.

When the ejector approaches its retracted position, cam plate 160 on the ejector operates the limit switch 158. The opening of its contacts 158a deenergizes the initiating relay 233 so that it drops out and is conditioned for initiating another travel of the ejector from its retracted position upon operation of limit switch 156. The closing of the contacts 158b of limit switch 158 energizes the operating winding 235 of relay 236, causing it to pick up and open its contacts 240, 242, and 243 and close its contacts 241.

The opening of contacts 240 of relay 236 deenergizes the up winding 226 of the reversing switch 224 and, thus, stops the magazine feed motor. The opening of contacts 243 of relay 236 opens the anode-cathode circuit of the arc discharge device 247 of the electronic timer 244 and thereby establishes conditions for charging the timing capacitor 252 thereof to acquire its hold-off voltage for the next timing operation. The opening of contacts 243 also deenergizes relay 245 of the electric timer which drops out and closes its contacts 257 and opens its contacts 258. The opening of contacts 242 of relay 236 and the opening of contacts 258 of relay 245 deenergize the operating winding 267 of relay 266 causing it to drop out and close its contacts 268 to prepare the energizing circuit for the operating winding 239 of relay 222.

The closing of contacts 241 of relay 236 and the closing of contacts 257 of relay 245 re-energize the operating winding 260 of relay 249, causing it to pick up and close its contacts 261 and 262 and to open its contacts 248 and 262. The closing of contacts 262 of relay 249 prepares the energizing circuit of winding 227 of the reversing switch 224 for the magazine motor 99 for re-energization upon closure of contacts 237 of the initiating relay 233. The closure of contacts 261 of relay 249 will maintain the energization of relay 249 when the ejector is again operated and moved from its retracted position resulting in the deenergization of the operating winding 235 of relay 236. The opening of contacts 248 of relay 249 and the closing of contacts 243 of relay 236 upon the next operation of the ejector again conditions the anode-cathode circuit of the arc discharge device 247 of the electronic timer for completion and initiation of the timing operation upon the closure of contacts 250 of relay 220.

The control is thus conditioned for another operation which will operate the ejector for feeding a new unit length electrode from the magazine upon closure of the electrode switch 156.

The various manually operated switches shown in the control system are provided for testing, adjusting, and correcting the operation of the system. Thus, it is possible to operate the magazine motor by closing the contacts 269 of the push button labelled "Mag. Weld" without initiating the arc welding operation by closing the "Start" and "Weld Start" push buttons. By opening switch 270, relay operation can be tested without operating the magazine motor 99. Likewise, the electrode column 150 may be adjusted in its feeding means by operating the "Raise" and "Lower" push buttons which connect the amplidyne 187 to the armature 185 to the electrode feed motor. It will be noted that when the welding arc supply circuit is disconnected and the voltage across the welded electrode column 150 and the work 212 is zero, current flow through the control field of the amplidyne is in a direction to produce that amplidyne polarity which results in feeding the electrode column up during automatic operation. This changed condition existing during manual operation has been allowed for by the manner in which the "Raise" and "Lower" push buttons connect the armature 185 of the electrode feed motor in circuit therewith.

If, during automatic arc welding operation, the travel carriage 7 arrives at the desired limit of its travel, operation of limit switches 295 or 296 will stop the movement of the travel carriage and operation of limit switch 294 will stop the automatic arc welding operation. Operation of the "Weld Stop" button will also stop the automatic arc welding operation. In either case, the delayed opening of relay 287 maintains the flow of arc welding current for a predetermined time after the movement of the travel carriage has been arrested, thus providing for a crater filling operation at the end of the weld.

As previously noted, the auxiliary power control and welding control circuits are deenergized whenever the grinder motor for the cutter mechanism 20 becomes overloaded. Additional protection may be provided by connecting the contacts of other relays in the energizing circuit of the operating winding 275 of this relay in the same manner as contacts 277 of relay 278 are connected in this circuit. Such relays may be responsive to overload on the motor 188 of the amplidyne set and overload on the travel carriage motor. Operating winding 275 of relay 274 may be also deenergized by operation of one or more limit switches in its circuit. For example, a limit switch operated when the grinding wheel is worn out may be used. Such limit switch would be actuated whenever the movement of the grinding wheel toward the electrode column was of a magnitude to indicate this condition of the grinding wheel.

Other safety features may be embodied in the control illustrated. One such feature would prevent operation of the electrode feed motor by actuation of push button 199 until after the up winding 226 of reversing switch 224 for magazine motor 99 has been deenergized. This will prevent reversal of the magazine motor which would otherwise occur and cause the ejector and electrode column to be fed toward one another and the possibility of their destructive collision. For this purpose up winding 226 of switch 224 may actuate normally closed contacts connected between contacts 209 of relay 203 and the right hand contacts of raise push button 199.

Another safety feature could provide for deenergization of the welding circuit if due to eccentricity of the flux coating on the unit length electrodes, the grinding wheel of the grinding mechanism 20 did not base the core of the electrode. In order to accomplish this result, a relay having its winding connected between the work and an insulated brush of the contact mechanism may operate normally open contacts connected in circuit with contacts 305 of relay 302 across the weld start push button contacts 285. These contacts may be shunted by normally closed contacts of another relay having its winding in shunt to the winding 308 of relay 309 to provide for sealing in of relay 302 when the welding contactor 215 has not been picked up by operation of relay 309.

Under certain conditions of operation the grinder solenoid 211 may be periodically operated by a timer mechanism having contacts in series circuit with the contacts 284 of the grinder switch so that so long as these contacts are closed the grinding wheel will be fed by small increments under the control of this timer mechanism.

Furthermore, relay 222 may be operated by a limit switch actuated by cam 160 on the ejector when the leading end of an ejected unit length electrode first enters the arcing chamber formed by sheets 148 of the aligner 134 in which case contacts 238 of relay 233 could be omitted as could contacts 306 of relay 302 and contacts 269 of the magazine weld push button.

A positive stop may also be provided for limiting the down travel of the ejector so that its superstructure will not come into arcing engagement with the magazine. The slip clutch 86 of the magazine drive will accommodate the use of such a positive limit stop. Furthermore, the lost motion coupling of the magazine drive may be adjusted for no lost motion and the magazine motor reversed by operation of relay 249 when operation of timer 244 deenergizes this relay.

Contact 100 of the ejector may be made of carbon instead of a metal such as copper in order to prevent welding of the contact to the upper end of a unit length electrode which may occur when using high current values for welding the unit length electrode to the electrode column.

It is quite obvious that in view of the embodiment of my invention above described, various modifications other than those suggested will occur to those skilled in the art and that such modifications may be made without departing from the spirit and scope of my invention. Thus, while I have shown and described but one embodiment of my invention, it will be understood that I intend to cover by the appended claims all such modifications as fall within the true spirit and scope thereof.

What I claim as new and desire to secure by Letters Patent of the United States is:

1. Automatic arc welding apparatus comprising means for lengthwise feeding a continuous column of unit length electrodes welded together in end to end engagement, a guide supported in fixed position relative to said feeding means and having a surface which locates unit length electrodes held in side engagement therewith in end alignment with said welded electrode column in said feeding means, means for holding a supply of unit length electrodes opposite said surface of said guide and in side by side relationship therewith and with one another, means for biasing said unit length electrodes in said holding means sidewise into successive engagement with said surface of said guide, a propelling member, an ejector on which said propelling member is mounted, a support along which said ejector has a travel which brings said propelling member thereon into propelling engagement with the end of a unit length electrode positioned by said guide, means for moving said ejector from and to a retracted position along a path of travel which brings said propelling member into engagement with the end of a unit length electrode positioned by said guide and propels it therealong into engagement with said electrode column in said feeding means, and means responsive to the engagement of said unit length electrode positioned by said guide with said welded electrode column in said feeding means for forming a welded union therebetween.

2. Automatic arc welding apparatus comprising means for lengthwise feeding a continuous column of unit length electrodes welded together in end to end engagement, a magazine having a plurality of circumferentially spaced guides for engaging the side surfaces of unit length electrodes, means in said magazine for successively directing into each of said guides the foremost of a supply of unit length electrodes held in side by side relationship with one another, means for rotatably supporting said magazine to position said guides one at a time in an electrode ejecting position in which the unit length electrodes therein are in end alignment with said welded electrode column, means responsive to the trailing end of said welded electrode column arriving at a predetermined position relative to said feeding means for lengthwise ejecting into end to end engagement with said welded electrode column that unit length electrode in said guide which is in electrode ejecting position, and means responsive to the engagement of said unit length electrode in said guide with said welded electrode column for forming a welded union therebetween.

3. Automatic arc welding apparatus comprising means for lengthwise feeding a continuous column of unit length electrodes welded together in end to end engagement, a guide engaging the side surfaces of unit length electrodes and positioning them in end alignment with said welded electrode column in said feeding means, means for successively supplying sidewise to said guide the foremost of a supply of unit length electrodes, means responsive to the trailing end of said welded electrode column arriving at a predetermined position relative to said feeding means for lengthwise ejecting a unit length electrode from said guide into end to end engagement with said welded electrode column, means for supplying arc welding current to said unit length electrode in said guide and to said welded electrode column, and means responsive to the flow of welding current upon engagement of said unit length electrode with said welded electrode column for withdrawing said unit length electrode from said welded electrode column to form an arc and after a predetermined time interval for interrupting said flow of welding current and forcing said unit length electrode into end to end engagement with said welded electrode column to form a weld, said means including an electromagnet having an operating winding connected in circuit with said arc welding current supply means and jaw members positioned on said ejecting means and actuated by said electromagnet to engage said unit length electrode in said guide and move it against a biasing means also positioned on said ejecting means.

4. Automatic arc welding apparatus comprising means for lengthwise feeding a continuous column of unit length electrodes welded together in end to end engagement, a guide engaging the side surfaces of unit length electrodes and positioning them in end alignment with said welded electrode column in said feeding means, means for supplying sidewise to said guide a succession of unit length electrodes, a contact, an ejector movable from and to a retracted position along a path of travel which moves said contact mounted thereon along a path of travel corresponding to the lengthwise path of travel of a unit length electrode along said guide, a second contact in engagement with said welded electrode column in said feeding means, means for supplying arc welding current to said contacts, means responsive to the trailing end of said welded electrode column arriving at a predetermined position relative to said feeding means for propelling a unit length electrode into end to end engagement with said welded electrode column by imparting forward travel to said ejector and a unit length electrode in said guide engaged by said contact on said ejector, means responsive to the engagement of a unit length electrode in said guide with said welded electrode column for arresting the forward travel of said ejector and after a rest period for returning said ejector to its retracted position, and means on said ejector and responsive to engagement between a unit length electrode in said guide and said welded electrode column for moving said unit length electrode and said ejector contact away from said welded electrode column to strike an arc between said unit length electrode and said welded electrode column and after a predetermined time interval for moving said unit length electrode and said ejector contact toward said welded electrode column to bring said unit length electrode into end engagement with said welded electrode column to form a weld.

5. Automatic arc welding apparatus comprising means for lengthwise feeding a continuous column of unit length electrodes welded together in end to end engagement, a guide engaging the side surfaces of unit length electrodes and positioning them in end alignment with said welded electrode column in said feeding means, means for successively directing to said guide the foremost of a supply of unit length electrodes held in side by side relationship with one another, a contact, an ejector movable from and to a retracted position along a path of travel which moves said contact mounted thereon along a path of travel corresponding to the lengthwise path of travel of a unit length electrode along said guide, a second contact in engagement with said welded electrode column in said feeding means, means for supplying arc welding current to said contacts, means responsive to the trailing end of said welded electrode column arriving at a predetermined position relative to said feeding means for propelling a unit length electrode into end to end engagement with said welded electrode column by imparting forward travel to said ejector at a rate of speed greater than but proportional to the feeding rate of said welded electrode column, means responsive to the engagement of a unit length electrode in said guide with said welded electrode column for arresting the forward travel of said ejector and after a rest period for returning said ejector to its retracted position, and means on said ejector and responsive to engagement between a unit length electrode in said guide and said welded electrode column for moving said unit length electrode and said ejector contact away from said electrode column to strike an arc between said unit length electrode and said welded electrode column and after a predetermined time interval for moving said unit length electrode and said ejector contact toward said welded electrode column to bring said unit length electrode into end engagement with said welded electrode column to form a weld.

6. Automatic arc welding apparatus comprising means for lengthwise feeding a continuous column of unit length electrodes welded together in end to end engagement, a magazine having a plurality of circumferentially spaced guides for engaging the side surfaces of unit length electrodes, means in said magazine for successively directing into each of said guides the foremost of a supply of unit length electrodes held in side by side relationship with one another, means for rotatably supporting said magazine to position said guides one at a time in an electrode ejecting position in which the unit length electrodes therein are in end alignment with said welded electrode column, a contact, an ejector on which said contact is mounted, said ejector having a travel relative to said magazine from and to a retracted position by which said contact is moved into end engagement with a unit length electrode in that one of said guides which is in electrode ejecting position and by which said unit length electrode is propelled along said guide into end engagement with said welded electrode column, means operated by the initial travel of said ejector from its retracted position for rotating said magazine by an amount which positions a different one of said guides in electrode ejecting position, a second contact in engagement with said welded electrode column in said feeding means, means for supplying arc welding current to said contacts, means responsive to the trailing end of said welded electrode column arriving at a predetermined position relative to said feeding means for propelling a unit length electrode into end to end engagement with said welded electrode column by imparting forward travel to said ejector at a rate of speed greater than but proportional to the feeding rate of said electrode column, means responsive to the engagement of a unit length electrode in said guide with said welded electrode column for arresting the forward travel of said ejector and after a rest period for returning said ejector to its retracted position, and means on said ejector and responsive to engagement between a unit length electrode in said guide and said welded electrode column for moving said unit length electrode and said ejector contact away from said welded electrode column to strike an arc between said unit length electrode and said welded electrode column and after a predetermined time interval for moving said unit length electrode and said ejector contact toward said welded electrode column to bring said unit length electrode into end engagement with said welded electrode column to form a weld.

7. Automatic arc welding apparatus comprising a magazine having a plurality of circumferentially spaced guides for engaging the side surfaces of unit length electrodes, means in said magazine for successively directing into each of said guides the foremost of a supply of unit length electrodes held in side by side relationship with one another, means for rotatably supporting said magazine to position said guides one at a time in an electrode ejecting position, a unit length electrode propelling member, an ejector on which said propelling member is mounted, a support along which said ejector has a travel which brings said propelling member thereon into propelling engagement with the end of a unit length electrode in that one of said guides which is in electrode ejecting position, means for moving said ejector along its said support from and to a retracted position in which said propelling member thereon is beyond the circular path of travel of said electrodes in said rotatably supported magazine, and means operated by movement of said ejector along its said support for rotating said magazine to position a different one of said guides in electrode ejecting position.

8. Automatic arc welding apparatus comprising means for lengthwise feeding a continuous column of unit length electrodes welded together in end to end engagement, a frame on which said feeding means is mounted, a support for said frame, an annular magazine having a base and inner and outer cylindrical side walls with electrode guides extending lengthwise of the inside surface of its inner wall and circumferentially spaced thereabout opposite holes in its base, means in said magazine for successively directing into each of said guides the foremost of a supply of unit length electrodes held in side by side relationship with one another, means for rotatably supporting said magazine on said frame so that each of said guides thereof may be moved in turn into an electrode ejecting position in which it aligns a unit length electrode therein with the welded electrode column in said feeding means, a unit length electrode propelling member, an ejector on which said propelling member is mounted, an ejector support mounted on said adapter and extending through the opening in said annular magazine, said ejector support slidably supporting said ejector for movement relative to said magazine along a path of travel which moves said propelling member into propelling engagement with the end of a unit length electrode in that one of said electrode guides which is in electrode ejecting position, and means operated by movement of said ejector for rotating said magazine by an amount which positions a different one of said guides in electrode ejecting position.

9. Automatic arc welding apparatus comprising means for lengthwise feeding a continuous column of unit length electrodes welded together in end to end engagement, a magazine having a plurality of circumferentially spaced guides for engaging the side surfaces of unit length electrodes, means in said magazine for successively directing sidewise into each of said guides the foremost of a supply of unit length electrodes held in side by side relationship with one another, means for supporting said magazine for rotation about an axis which positions said guides one at a time in an electrode ejecting position in which the unit length electrodes therein are in end alignment with said welded electrode column, a contact, an ejector on which said contact is mounted, means for propelling said ejector along a path of travel relative to said magazine from and to a retracted position by which said contact is moved into end engagement with a unit length electrode in that one of said guides which is in electrode ejecting position and by which said unit length electrode is propelled along said guide into end engagement with said electrode column, means operated by the initial travel of said ejector from its retracted position for rotating said magazine to position a different one of said guides in electrode ejecting position, means operated by further travel of said ejector from its retracted position and effective before said contact on said ejector engages the end of a unit length electrode in said guide which has been moved to electrode ejecting position, for locking said magazine against rotation, and means effective while said magazine is locked against rotation for welding the contacting ends of said unit length electrode and of said welded electrode column.

10. Automatic arc welding apparatus comprising means for lengthwise feeding a continuous column of unit length electrodes welded together in end to end engagement, an adapter on which said feeding means is mounted, an adapter support, an annular magazine having a base and inner and outer cylindrical side walls with electrode guides extending lengthwise of the inside surface of its inner wall and circumferentially spaced thereabout opposite holes in its base, means in said magazine for successively directing into each of said guides the foremost of a supply of unit length electrodes held in side by side relationship with one another, means for rotatably supporting said magazine on said adapter so that each of said guides thereof may be moved in turn into electrode ejecting position in which it aligns a unit length electrode therein with the welded electrode column in said feeding means, an ejector, an electrode engaging contact mounted on said ejector and biased to a predetermined position relative thereto, a second contact which makes engagement with said welded electrode column in said feeding means, means for supplying arc welding current to said contacts, an ejector support which is mounted on said adapter and extends through the opening in said annular magazine, said ejector support slidably supporting said ejector for movement relative to said magazine along a path of travel which moves said ejector contact into propelling engagement with the end of a unit length electrode in that one of said electrode guides which is in electrode ejecting position, means operated by the initial travel of said ejector from its retracted position for rotating said magazine by an amount which positions a different one of said guides in electrode ejecting position, means responsive to the trailing end of said electrode column arriving at a predetermined position relative to said feeding means for imparting forward travel to said ejector at a rate of speed greater than but proportional to the feeding rate of said electrode column, means responsive to the engagement of a unit length electrode in said guide with said electrode column for arresting the forward travel of said ejector and after a rest period for returning said ejector to its retracted position, and means on said ejector and responsive to engagement and arc welding current flow between a unit length electrode in said guide and said electrode column for moving said unit length electrode and said ejector contact away from said electrode column to strike an arc between said unit length electrode and said electrode column and after a predetermined time interval for interrupting the flow of arc welding current and moving said unit length electrode and said ejector contact toward said electrode column to bring said unit length electrode into end engagement with said electrode column to form a weld.

11. Automatic arc welding apparatus comprising means for lengthwise feeding a continuous column of unit length electrodes welded together in end to end engagement, a frame on which said feeding means is supported, a magazine having a plurality of circumferentially spaced guides for engaging the side surfaces of unit length electrodes, means in said magazine for successively directing sidewise into each of said guides the foremost of a supply of unit length electrodes held in side by side relationship with one another, means for supporting said magazine on said frame for rotation about an axis which positions said guides one at a time in an electrode ejecting position in which the unit length electrodes therein are in end alignment with said welded electrode column, a contact, an ejector on which said contact is mounted, a support on said frame and along which said ejector has a travel which brings said contact thereon into propelling engagement with a unit length electrode in that one of said guides which is in electrode ejecting position, means operated by the initial travel of said ejector from its retracted position for rotating said magazine to position a different one of said guides in electrode ejecting position, means operated by further travel of said ejector from its retracted position and effective before said contact on said ejector engages the end of a unit length electrode in said guide which has been moved to electrode ejecting position, for locking said magazine against rotation, an aligner supported on said frame for movement relative thereto, said aligner being located between said magazine and said feeding means and having members biased toward one another for engagement with the trailing end of said welded electrode column in said feeding means and having additional members respectively mounted on said first mentioned members and biased toward one another for engaging and directing the leading end of a unit length electrode ejected from said magazine into end engagement with said trailing end of said welded electrode column, shields mounted on said members of said aligner and forming an arcing chamber in the midportion of said aligner, means responsive to the trailing end of said welded electrode column arriving at a predetermined position relative to said feeding means for imparting forward travel to said ejector at a rate which brings the leading end of the ejected unit length electrode and the trailing end of said welded electrode column into engagement with one another within said arcing chamber formed by said shields, and means responsive to the engagement of said unit length electrode with said welded electrode column for forming an arc welded union therebetween.

12. Automatic arc welding apparatus comprising means for lengthwise feeding a continuous column of unit length electrodes welded together in end to end engagement, a frame on which said feeding means is supported, a bracket, a pivot shaft on said frame and journaled in said bracket, a torque tube on said shaft, two arms mounted on said torque tube, a crank shaft journaled on said bracket, a crank on said crank shaft, a lever one end of which is pivotally connected to one of said arms on said torque tube and the other end of which is journaled on said crank, an eccentric, a lever one end of which is provided with a collar for said eccentric and the other end of which is pivotally connected to the other end of said arms on said torque tube, means for rotatably adjusting said eccentric relative to said frame, a magazine having a plurality of circumferentially spaced guides for engaging the side surfaces of unit length electrodes, means in said magazine for successively directing sidewise into each of said guides the foremost of a supply of unit length electrodes held in side by side relationship with one another, means for supporting said magazine on said frame for rotation about an axis which positions said guides one at a time in an electrode ejecting position in which the unit length electrodes therein are in end alignment with said welded electrode column, a contact, an ejector on which said contact is mounted, a support on said frame and along which said ejector has a travel which brings said contact thereon into propelling engagement with a unit length electrode in that one of said guides which is in electrode ejecting position, means operated by the initial travel of said ejector from its retracted position for rotating said magazine to position a different one of said guides in electrode ejecting position, means operated by further travel of said ejector from its retracted position and effective before said contact on said ejector engages the end of a unit length electrode in said guide which has been moved to electrode ejecting position, for locking said magazine against rotation, an aligner supported on said frame for movement relative thereto, said aligner being located between said magazine and said feeding means and having members biased toward one another for engagement with the trailing end of said welded electrode column in said feeding means and having additional members respectively mounted on said first mentioned members and biased toward one another for engaging and directing the leading end of a unit length electrode ejected from said magazine into end engagement with said trailing end of said welded electrode column, shields mounted on said members of said aligner and forming an arcing chamber in the midportion of said aligner, means responsive to the trailing end of said welded electrode column arriving at a predetermined position relative to said feeding means for imparting forward travel to said ejector at a rate which brings the leading end of the ejected unit length electrode and the trailing end of said welded electrode column into engagement with one another within said arcing chamber formed by said shields, and means responsive to the engagement of said unit length electrode with said welded electrode column for forming an arc welded union therebetween.

13. Arc welding apparatus comprising an electrode feeding means, a frame on which said feeding means is supported, a bracket, a pivot shaft on said frame and journaled in said bracket, a torque tube on said shaft, two arms mounted on said torque tube, a crank shaft journaled on said bracket, a crank on said crank shaft, a lever one end of which is pivotally connected to one of said arms on said torque tube and the other end of which is journaled on said crank, an eccentric, a lever therefor one end of which is provided with a collar for said eccentric and the other end of which is pivotally connected to the other of said arms on said torque tube, and means for rotatably adjusting said eccentric relative to said frame.

14. Automatic arc welding apparatus comprising means for lengthwise feeding a continuous column of unit length electrodes welded together in end to end engagement, a frame on which said feeding means is supported, means on said frame for feeding unit length electrodes one at a time into end engagement with said welded electrode column, an aligner having members biased toward one another for engagement with said welded electrode column and having additional members respectively mounted on said first mentioned members and biased toward one another for engaging and directing into end engagement with said trailing end of said welded electrode column the leading end of a unit length electrode, and means for supporting said aligner on said frame for lateral movement relative thereto in accordance with the position of the trailing end of said welded electrode column.

15. Automatic arc welding apparatus comprising means for lengthwise feeding a continuous column of unit length electrodes welded together in end to end engagement, a frame on which said feeding means is supported, an aligner having members biased toward one another for engagement with said welded electrode column and having additional members respectively mounted on said first mentioned members and biased toward one another for engaging and directing into end engagement with said trailing end of said welded electrode column the leading end of a unit length electrode, means for supporting said aligner on said frame for lateral movement relative thereto in accordance with the position of the trailing end of said welded electrode column, shields mounted on said members of said aligner and forming an arcing chamber in the midportion of said aligner, means mounted on said frame and responsive to the trailing end of said welded electrode column arriving at a predetermined position in said frame for feeding unit length electrodes one at a time into end engagement therewith within said arcing chamber of said aligner, and means responsive to the engagement of said unit length electrode with said welded electrode column for forming an arc welded union therebetween.

16. Automatic arc welding apparatus comprising means for lengthwise feeding a continuous column of unit length electrodes welded together in end to end engagement, an adapter on which said feeding means is mounted, an adapter support, an annular magazine in which unit length electrodes are held in side by side relationship for lengthwise ejection therefrom one at a time into end engagement with the trailing end of said welded electrode column, said magazine having a base with inner and outer walls spaced from one another to form an open ended receptacle which is divided into electrode holding cells by fixed and adjustable partitions extending radially between its side walls on opposite sides of electrode guides extending lengthwise of the inside surface of its inner wall and circumferentially spaced thereabout opposite holes in its base corresponding in spacing to that of circumferentially spaced notches on the outside surface of its inner wall, a member in each of said magazine cells which is biased against the outermost of a supply of unit length electrodes located in side by side relationship therein for holding the foremost of said electrodes in said guide at the inner end of each of said cells, means for rotatably supporting said magazine on said adapter so that each of said guides thereof may be moved in turn into electrode ejecting position in which it aligns a unit length electrode therein with the welded electrode column in said feeding means, an ejector, an electrode engaging contact mounted on said ejector and biased to a predetermined position relative thereto, an electromagnet mounted on said ejector and having an operating winding one terminal of which is connected to said ejector contact, a second contact which makes engagement with said welded electrode column in said feeding means, means for supplying arc welding current to the other terminal of said operating winding of said electromagnet and to said second contact, electrode engaging jaw members mounted on said ejector between said ejector contact and said magazine, means actuated by said electromagnet for closing said jaws into engagement with a unit length electrode extending therebetween and into engagement with said ejector contact, an ejector support which is mounted on said adapter and extends through the opening in said annular magazine, said ejector support slidably supporting said ejector for movement relative to said magazine along a path of travel which moves said ejector contact into propelling engagement with the end of a unit length electrode in that one of said electrode guides which is in electrode ejecting position, a slide mounted for lateral movement on said ejector support, a cam follower and pawl mounted on said slide for movement therewith, said pawl being biased into engagement with said notches on the outside surface of the inner side wall of said magazine, a cam which engages said cam follower and which is mounted on and extends lengthwise of said ejector, said cam having a configuration which moves said cam follower and pawl laterally of said ejector support upon initial movement of said ejector from its retracted position by an amount which rotates said magazine to position a different electrode guide and cell thereof in electrode ejecting position, a locking member mounted on said ejector support and biased into locking engagement with said magazine to hold it in one of its electrode ejecting positions, a member which engages and moves said locking member against its bias to release said magazine, said member being mounted on said ejector for movement therewith and being of sufficient length to engage said locking member prior to and during the time that lateral movement is imparted to said cam follower and its said supporting slide, and means for propelling said ejector along its said support from and to a retracted position in which said ejector contact is withdrawn from the circular path of travel of unit length electrodes in said magazine.

17. Automatic arc welding apparatus comprising means for lengthwise feeding a continuous column of unit length electrodes welded together in end to end engagement, an adapter on which said feeding means is mounted, an annular magazine having a plurality of circumferentially spaced guides for engaging the side surface of unit length electrodes, means in said magazine for successively directing into each of said guides the foremost of a supply of unit length electrodes held in side by side relationship with one another, means for rotatably supporting said magazine on said adapter so that each of said guides thereof may be moved in turn into electrode ejecting position in which it aligns a unit length electrode therein with the welded electrode column in said feeding means, an ejector, an electrode engaging contact mounted on said ejector and biased to a predetermined position relative thereto, a second contact which makes engagement with said welded electrode column in said feeding means, a circuit through which arc welding current is supplied to said contacts, means on said ejector and responsive to the flow of arc welding current in said circuit upon engagement of a unit length electrode with said welded electrode column for moving said unit length electrode lengthwise of said ejector to strike an arc between said unit length electrode and said welded electrode column, an ejector support which is mounted on said adapter and extends through the opening in said annular magazine, said ejector support slidably supporting said ejector for movement relative to said magazine along a path of travel which moves said ejector contact into propelling engagement with the end of a unit length electrode in that one of said electrode guides which is in electrode ejecting position, means operated by the initial travel of said ejector from its retracted position for rotating said magazine to position a different one of said guides in electrode ejecting position, means operated by said ejector travel after said magazine has been rotated to a new electrode ejecting position for locking said magazine in said position, means for propelling said ejector along its said support from and to a retracted position in which said ejector contact is withdrawn from the circular path of travel of unit length electrode in said magazine, said means including a slip clutch and an adjustable lost motion connection which imparts a rest period in the movement of said ejector when its direction of travel is changed by said propelling means, a limit switch mounted on said adapter and having its operating member in the path of travel of unit length electrodes ejected from said magazine, two additional limit switches mounted on said ejector support and operated by the initial and final movement of said ejector from and to its retracted position, means controlled by the operation of said first mentioned limit switch for energizing said ejector propelling means to impart forward travel to said ejector from its retracted position at a rate of speed which is greater than but proportional to the feeding rate of said welded electrode column, means including one of said additional limit switches for maintaining said forward travel until the leading end of a unit length electrode ejected from said magazine has come into engagement with the trailing end of the welded electrode column, means including the other of said additional limit switches for setting a timer which when tripped determines the time interval during which current flows in said arc welding circuit, and a second means responsive to the flow of arc welding current in said circuit upon engagement of said unit length electrode with said welded electrode column for tripping said timer and for operating said ejector propelling means to return said ejector to its retracted position.

18. Automatic arc welding apparatus comprising means for lengthwise feeding a continuous column of unit length electrodes welded together in end to end engagement, an adapter on which said feeding means is mounted, an annular magazine in which unit length electrodes are held in side by side relationship for lengthwise ejection therefrom one at a time into end engagement with the trailing end of said welded electrode column, said magazine having a base with inner and outer side walls spaced from one another to form an open ended receptacle which is divided into electrode holding cells by fixed and adjustable partitions extending radially between its side walls on opposite sides of electrode guides extending lengthwise of its inner wall and circumferentially spaced thereabout opposite holes in its base corresponding in spacing to that of circumferentially spaced notches exterior of said receptacle on the other side of its inner wall, biasing means for feeding unit length electrodes in said cells into said magazine guides, said means including levers adjustable circumferentially of the outer wall of said magazine on which they are mounted opposite each of said cells, means for rotatably supporting said magazine on said adapter so that each of said guides thereof may be moved in turn into electrode ejecting position in which it aligns a unit length electrode therein with the welded electrode column in said feeding means, an aligner supported on said adapter for movement relative thereto, said aligner having members biased toward one another for engagement with the trailing end of said welded electrode column and having additional members respectively mounted on said first mentioned members and biased toward one another for engaging and directing the leading end of a unit length electrode ejected from said magazine into end engagement with said trailing end of said welded electrode column, shields mounted on said members of said aligner and forming an arcing chamber in the midportion of said aligner, an ejector, an electrode engaging contact mounted on said ejector and biased to a predetermined position relative thereto, an electromagnet mounted on said ejector and having an operating winding one terminal of which is connected to said ejector contact, a second contact which makes engagement with said welded electrode column in said feeding means, means for supplying arc welding current to the other terminal of said operating winding of said electromagnet and to said second contact, electrode engaging jaw members mounted on said ejector between said ejector contact and said magazine, means actuated by said electromagnet for closing said jaws into engagement with a unit length electrode extending therebetween and into engagement with said ejector contact, and for moving said unit length electrode against the bias of said ejector contact, an ejector support which is mounted on said adapter and extends through the opening in said annular magazine, said ejector support slidably supporting said ejector for movement relative to said magazine along a path of travel which moves said ejector contact into propelling engagement with the end of a unit length electrode in that one of said electrode guides which is in electrode ejecting position, a slide mounted for lateral movement on said ejector support, a cam follower and pawl mounted on said slide for movement therewith, said pawl being biased into engagement with said notched surface of the inner side wall of said magazine, a cam which engages said cam follower and which is mounted on and extends lengthwise of said ejector, said cam having a configuration which moves said cam follower and pawl laterally of said ejector support upon initial movement of said ejector from its retracted position by an amount which rotates said magazine to position a different electrode guide and cell thereof in electrode ejecting position, a locking member mounted on said ejector support and biased into locking engagement with said magazine to hold it in one of its electrode ejecting positions, a member which engages and moves said locking member against its bias to release said magazine, said member being mounted on said ejector for movement therewith and being of sufficient length to engage said locking member prior to and during the time that lateral movement is imparted to said cam follower and its said supporting slide, and means for propelling said ejector along its said support from and to a retracted position in which said ejector contact is withdrawn from the circular path of travel of unit length electrodes in said magazine, said means including an adjustable lost motion connection which imparts a rest period in the movement of said ejector when its direction of travel is changed by said propelling means.

19. Automatic arc welding apparatus comprising means for lengthwise feeding a continuous column of unit length electrodes welded together in end to end engagement, an adapter on which said feeding means is mounted, an adapter support, pivot means for adjusting said adapter on its said support, an oscillator mounted on said adapter support and acting on said adapter through said pivot means to move said adapter to and fro relatively to its said support, an annular magazine in which unit length electrodes are held in side by side relationship for lengthwise ejection therefrom one at a time into end engagement with the trailing end of said welded electrode column, said magazine having a base with inner and outer side walls spaced from one another to form an open ended receptacle which is divided into electrode holding cells by fixed and adjustable partitions extending radially between its side walls on opposite sides of electrode guides extending lengthwise of the inside surface of its inner wall and circumferentially spaced thereabout opposite holes in its base corresponding in spacing to that of circumferentially spaced notches on the outside surface of its inner wall, a member in each of said magazine cells which is biased against the outermost of a supply of unit length electrodes located in side by side relationship therein for holding the foremost of said electrodes in said guide at the inner end of each of said cells, means for rotatably supporting said magazine on said adapter so that each of said guides thereof may be moved in turn into electrode ejecting position in which it aligns a unit length electrode therein with the welded electrode column in said feeding means, an aligner supported on said adapter for movement relative thereto, said aligner having members biased toward one another for engagement with the trailing end of said welded electrode column, and having additional members respectively mounted on said first mentioned members and biased toward one another for engaging and directing the leading end of a unit length electrode ejected from said magazine into end engagement with said trailing end of said welded electrode column, shields mounted on said members of said aligner and forming an arcing chamber in the midportion of said aligner, an ejector, an electrode engaging contact mounted on said ejector and biased to a predetermined position relative thereto, an electromagnet mounted on said ejector and having an operating winding one terminal of which is connected to said ejector contact, a second contact which makes engagement with said welded electrode column in said feeding means, means for supplying arc welding current to the other terminal of said operating winding of said electromagnet and to said second contact, electrode engaging jaw members mounted on said ejector between said ejector contact and said magazine, means actuated by said electromagnet for closing said jaws into engagement with a unit length electrode extending therebetween and into engagement with said ejector contact, and for moving said unit length electrode against the bias of said ejector contact guides on said jaw members for directing the end of a unit length electrode therebetween and into engagement with said ejector contact, a deflector on said ejector positioned to engage the foremost unit length electrode in the next adjacent guide to that one which is in electrode ejecting position for positioning it in lengthwise engagement with said next adjacent guide, an ejector support which is mounted on said adapter and extends through the opening in said annular magazine, said ejector support slidably supporting said ejector for movement relative to said magazine along a path of travel which moves said ejector contact into propelling engagement with the end of a unit length electrode in that one of said electrode guides which is in electrode ejecting position, a slide mounted for lateral movement on said ejector support, a cam follower and pawl mounted on said slide for movement therewith, said pawl being biased into engagement with said notches on the outside surface of the inner side wall of said magazine, a cam which engages said cam follower and which is mounted on and extends lengthwise of said ejector, said cam having a configuration which moves said cam follower and pawl laterally of said ejector support upon initial movement of said ejector from its retracted position by an amount which rotates said magazine to position a different electrode guide and cell thereof in electrode ejecting position, a locking member mounted on said ejector support and biased into locking engagement with said magazine to hold it in one of its electrode ejecting positions, a member which engages and moves said locking member against its bias to release said magazine, said member being mounted on said ejector for movement therewith and being of sufficient length to engage said locking member prior to and during the time that lateral movement is imparted to said cam follower and its said supporting slide, means for propelling said ejector along its said support from and to a retracted position in which said ejector contact is withdrawn from the circular path of travel of unit length electrodes in said magazine, said means including a slip clutch and an adjustable lost motion connection which imparts a rest period in the movement of said ejector when its direction of travel is changed by said propelling means, a limit switch mounted on said adapter and having its operating member in the path of travel of unit length electrodes ejected from said magazine into said aligner, two additional limit switches mounted on said ejector support and operated by the initial and final movement of said ejector from and to its retracted position, means controlled by the operation of said first mentioned limit switch for energizing said ejector propelling means to impart forward travel to said ejector from its retracted position at a rate of speed which is greater than, but proportional to the feeding rate of said welded electrode column, means including one of said additional limit switches for maintaining said forward travel until the leading end of a unit length electrode ejected from said magazine has entered the arcing chamber in said aligner and come into engagement with trailing end of the welded electrode column therein, means including the other of said additional limit switches for setting a timer which when tripped determines the time interval during which current flows in said arc welding circuit, and means responsive to the flow of current in said arc welding circuit upon engagement of said unit length electrode with said welded electrode column for tripping said timer and for operating said ejector propelling means to return said ejector to its retracted position.

WAYNE E. WILSON.

REFERENCES CITED

The following references are of record in the file of this patent:

UNITED STATES PATENTS

| Number | Name | Date |
|---|---|---|
| 2,356,802 | Tuttle | Aug. 29, 1944 |